(12) United States Patent
Wakabayashi et al.

(10) Patent No.: US 7,586,815 B2
(45) Date of Patent: Sep. 8, 2009

(54) PICKUP LENS WITH PHASE COMPENSATOR AND OPTICAL PICKUP APPARATUS USING THE SAME

(75) Inventors: Koichiro Wakabayashi, Ibaraki (JP); Keiko Hirao, Ibaraki (JP); Mitsuhiro Miyauchi, Ibaraki (JP); Yutaka Makino, Ibaraki (JP); Yasuyuki Sugi, Ibaraki (JP); Yoshikazu Mitsui, Ibaraki (JP)

(73) Assignee: Hitachi Maxell, Ltd., Ibaraki (JP)

( * ) Notice: Subject to any disclaimer, the term of this patent is extended or adjusted under 35 U.S.C. 154(b) by 622 days.

(21) Appl. No.: 11/252,804

(22) Filed: Oct. 19, 2005

(65) Prior Publication Data

US 2006/0083122 A1     Apr. 20, 2006

(30) Foreign Application Priority Data

Oct. 20, 2004     (JP)     ............... 2004-305575

(51) Int. Cl.
*G11B 7/00* (2006.01)

(52) U.S. Cl. ............... 369/44.23; 369/112.02

(58) Field of Classification Search ............ None
See application file for complete search history.

(56) References Cited

U.S. PATENT DOCUMENTS 6,084,843 A * 7/2000 Abe et al. ............ 369/112.07
6,556,534 B2 * 4/2003 Shimozono ............ 369/112.26
6,687,037 B2 * 2/2004 Hendriks et al. ............ 359/205
7,248,409 B2 * 7/2007 Komma et al. ............ 359/569
2003/0072246 A1 * 4/2003 Nishiwaki et al. ...... 369/112.26
2003/0107981 A1 * 6/2003 Hendriks et al. ....... 369/112.26

FOREIGN PATENT DOCUMENTS

| JP | A-9-54977 | 2/1997 |
| JP | A-10-269611 | 10/1998 |
| JP | A-2001-229567 | * 8/2001 |
| JP | A-2004-6005 | 1/2004 |
| JP | A-2004-79146 | 3/2004 |
| JP | A-2004-127510 | 4/2004 |
| JP | A-2004-164817 | * 6/2004 |
| JP | A-2004-219977 | * 8/2004 |
| WO | WO 03/091764 | * 11/2003 |

* cited by examiner

*Primary Examiner*—Peter Vincent Agustin
(74) *Attorney, Agent, or Firm*—Oliff & Berridge, PLC

(57) ABSTRACT

A pickup lens with a phase compensator is composed of a condenser lens and a phase compensator. At least one surface of the condenser lens has a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$. The phase compensator compensates wavefront aberration generated when recording and reproducing data on an information recording medium having a substrate thickness of t3 with a laser beam having a wavelength $\lambda 3$.

8 Claims, 34 Drawing Sheets

FIRST EMBODIMENT HD-DVD (BLUE; 405nm)
OBJECTIVE LENS FOCAL LENGTH 3.1mm  NA 0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | PHASE PLATE SURFACE; OBJECT SIDE | ∞ | 1 | GLASS OR EQUIVALENT | 1.83164 | — |
| 4 | PHASE PLATE SURFACE; IMAGE SURFACE SIDE | ∞ | 0.2 | AIR | 1 | — |
| 5 | LENS SURFACE; OBJECT SIDE | ASPHERICAL SURFACE | 2.2 | PLASTIC OR EQUIVALENT | 1.520148 | — |
| 6 | LENS SURFACE; IMAGE SURFACE SIDE | ASPHERICAL SURFACE | 1.535973 | AIR | 1 | — |
| 7 | DISK SURFACE; OBJECT SIDE | ∞ | 0.6 | PC | 1.6235 | — |
| 8 | DISK INFORMATION RECORDING SURFACE | ∞ | — | — | — | — |

Fig. 8

FIRST EMBODIMENT DVD (655nm)

OBJECTIVE LENS FOCAL LENGTH 3.20316mm  NA 0.600

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.844 |
| 3 | PHASE PLATE SURFACE; OBJECT SIDE | ∞ | 1 | GLASS OR EQUIVALENT | 1.7911 | — |
| 4 | PHASE PLATE SURFACE; IMAGE SURFACE SIDE | ∞ | 0.2 | AIR | 1 | — |
| 5 | LENS SURFACE; OBJECT SIDE | ASPHERICAL SURFACE | 2.2 | PLASTIC OR EQUIVALENT | 1.502116 | — |
| 6 | LENS SURFACE; IMAGE SURFACE SIDE | ASPHERICAL SURFACE | 1.627887 | AIR | 1 | — |
| 7 | DISK SURFACE; OBJECT SIDE | ∞ | 0.6 | PC | 1.58 | — |
| 8 | DISK INFORMATION RECORDING SURFACE | ∞ | — | — | — | — |

Fig. 9

FIRST EMBODIMENT   CD (790nm)

OBJECTIVE LENS FOCAL LENGTH 3.22422mm   NA 0.438

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 2.824 |
| 3 | PHASE PLATE SURFACE; OBJECT SIDE | ∞ | 1 | GLASS OR EQUIVALENT | 1.783555 | — |
| 4 | PHASE PLATE SURFACE; IMAGE SURFACE SIDE | ASPHERICAL SURFACE | 0.2 | AIR | 1 | — |
| 5 | LENS SURFACE; OBJECT SIDE | ASPHERICAL SURFACE | 2.2 | PLASTIC OR EQUIVALENT | 1.498584 | — |
| 6 | LENS SURFACE; IMAGE SURFACE SIDE | ∞ | 1.27 | AIR | 1 | — |
| 7 | DISK SURFACE; OBJECT SIDE | ∞ | 1.2 | PC | 1.57163 | — |
| 8 | DISK INFORMATION RECORDING SURFACE | | — | | — | — |

Fig. 10

OBJECT SURFACE SIDE: ZONE j = 1 TO 6

| ZONE j | | | | | | | | |
|---|---|---|---|---|---|---|---|---|
| 1<br>HD-DVD<br>/DVD<br>COMMON USE<br>AREA | R | 1.959389E+00 | C | 5.103631E-01 | K | -7.205348E-01 | | |
| | A4 | 6.005385E-03 | A6 | -3.219739E-04 | A8 | 2.119519E-04 | A10 | -9.212116E-05 |
| | A12 | 2.957499E-05 | A14 | -7.865895E-06 | A16 | 8.654400E-07 | | |
| | | | B | 0 | | | | |
| | AREA RANGE | | SMALL | 0 | | | | |
| | | | LARGE | 0.527996798 | | | | |
| 2<br>HD-DVD<br>/DVD<br>COMMON USE<br>AREA | R | 1.959891E+00 | C | 5.102324E-01 | K | -7.039257E-01 | | |
| | A4 | 5.723851E-03 | A6 | -3.403061E-04 | A8 | 2.085612E-04 | A10 | -9.127382E-05 |
| | A12 | 2.930017E-05 | A14 | -7.816852E-06 | A16 | 8.609070E-07 | | |
| | | | B | -0.001467259 | | | | |
| | AREA RANGE | | SMALL | 0.527996798 | | | | |
| | | | LARGE | 0.786735246 | | | | |
| 3<br>HD-DVD<br>/DVD<br>COMMON USE<br>AREA | R | 1.960395E+00 | C | 5.101013E-01 | K | -7.128329E-01 | | |
| | A4 | 5.867476E-03 | A6 | -3.294059E-04 | A8 | 2.099570E-04 | A10 | -9.157442E-05 |
| | A12 | 2.941022E-05 | A14 | -7.822968E-06 | A16 | 8.598830E-07 | | |
| | | | B | -0.002933341 | | | | |
| | AREA RANGE | | SMALL | 0.786735246 | | | | |
| | | | LARGE | 1.024524571 | | | | |
| 4<br>HD-DVD<br>/DVD<br>COMMON USE<br>AREA | R | 1.960899E+00 | C | 5.099702E-01 | K | -6.941503E-01 | | |
| | A4 | 5.553732E-03 | A6 | -3.542139E-04 | A8 | 2.094730E-04 | A10 | -9.242132E-05 |
| | A12 | 2.961794E-05 | A14 | -7.846957E-06 | A16 | 8.597785E-07 | | |
| | | | B | -0.004399923 | | | | |
| | AREA RANGE | | SMALL | 1.024524571 | | | | |
| | | | LARGE | 1.288301864 | | | | |
| 5<br>HD-DVD<br>/DVD<br>COMMON USE<br>AREA | R | 1.961403E+00 | C | 5.098392E-01 | K | -6.934709E-01 | | |
| | A4 | 5.538310E-03 | A6 | -3.552138E-04 | A8 | 2.098862E-04 | A10 | -9.274881E-05 |
| | A12 | 2.971995E-05 | A14 | -7.853569E-06 | A16 | 8.587684E-07 | | |
| | | | B | -0.005865956 | | | | |
| | AREA RANGE | | SMALL | 1.288301864 | | | | |
| | | | LARGE | 1.772573456 | | | | |
| 6<br>HD-DVD<br>/DVD<br>COMMON USE<br>AREA | R | 1.960899E+00 | C | 5.099702E-01 | K | -6.912541E-01 | | |
| | A4 | 5.505881E-03 | A6 | -3.583773E-04 | A8 | 2.095101E-04 | A10 | -9.261613E-05 |
| | A12 | 2.966715E-05 | A14 | -7.854761E-06 | A16 | 8.602322E-07 | | |
| | | | B | -0.004402928 | | | | |
| | AREA RANGE | | SMALL | 1.772573456 | | | | |
| | | | LARGE | 1.874331451 | | | | |

Fig. 11

OBJECT SURFACE SIDE: ZONE j = 7 TO 10

| ZONE j | | | | | | | | |
|---|---|---|---|---|---|---|---|---|
| 7<br>HD-DVD<br>/DVD<br>COMMON USE<br>AREA | R | 1.960394E+00 | C | 5.101016E-01 | K | -6.873360E-01 | | |
| | A4 | 5.444368E-03 | A6 | -3.623032E-04 | A8 | 2.074734E-04 | A10 | -9.173175E-05 |
| | A12 | 2.939431E-05 | A14 | -7.823411E-06 | A16 | 8.597143E-07 | | |
| | | | B | -0.002936374 | | | | |
| | | AREA RANGE | SMALL | 1.874331451 | | | | |
| | | | LARGE | 1.921896 | | | | |
| 8<br>HD-DVD<br>EXCLUSIVE<br>USE AREA | R | 1.960394E+00 | C | 5.101016E-01 | K | -6.873360E-01 | | |
| | A4 | 5.444368E-03 | A6 | -3.623032E-04 | A8 | 2.074734E-04 | A10 | -9.173175E-05 |
| | A12 | 2.939431E-05 | A14 | -7.823411E-06 | A16 | 8.597143E-07 | | |
| | | | B | -0.002936374 | | | | |
| | | AREA RANGE | SMALL | 1.921896 | | | | |
| | | | LARGE | 1.982830412 | | | | |
| 9<br>HD-DVD<br>EXCLUSIVE<br>USE AREA | R | 1.959891E+00 | C | 5.102326E-01 | K | -6.947535E-01 | | |
| | A4 | 5.571854E-03 | A6 | -3.527846E-04 | A8 | 2.082131E-04 | A10 | -9.160652E-05 |
| | A12 | 2.937104E-05 | A14 | -7.828154E-06 | A16 | 8.615060E-07 | | |
| | | | B | -0.001466768 | | | | |
| | | AREA RANGE | SMALL | 1.936312884 | | | | |
| | | | LARGE | 1.982830412 | | | | |
| 10<br>HD-DVD<br>EXCLUSIVE<br>USE AREA | R | 1.959388E+00 | C | 5.103636E-01 | K | -6.819509E-01 | | |
| | A4 | 5.363374E-03 | A6 | -3.701122E-04 | A8 | 2.065839E-04 | A10 | -9.147056E-05 |
| | A12 | 2.928520E-05 | A14 | -7.825434E-06 | A16 | 8.626159E-07 | | |
| | | | B | 3.03224E-06 | | | | |
| | | AREA RANGE | SMALL | 1.982830412 | | | | |
| | | | LARGE | 2.016 | | | | |

Fig. 12

IMAGE SURFACE SIDE

| | | | | | | | | |
|---|---|---|---|---|---|---|---|---|
| R2 | R | -5.608087E+00 | C | -1.783139E-01 | K | -5.506429E+01 | | |
| | A4 | 4.689891E-03 | A6 | -2.015207E-03 | A8 | -1.091107E-04 | A10 | 1.343906E-04 |
| | A12 | 7.694800E-06 | A14 | -8.013337E-06 | A16 | 8.706881E-07 | | |
| | | | B | 0 | | | | |
| | | AREA RANGE | SMALL | 0 | | | | |
| | | | LARGE | 1.676074 | | | | |

Fig. 13

DIFFERENCE IN OPTICAL PATH LENGTH (λ)
BETWEEN ZONE 1 AND ZONE 2 TO 10

| ZONE j | OPTICAL PATH LENGTH DIFFERENCE FROM ZONE 1 | | |
|---|---|---|---|
| | WAVELENGTH 405nm, HD DVD | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 6 | 3 | – |
| 7 | 4 | 2 | – |
| 8 | 4 | – | – |
| 9 | 2 | – | – |
| 10 | 0 | – | – |

SECOND EMBODIMENT HD-DVD (BLUE; 405nm)
OBJECTIVE LENS FOCAL LENGTH 3.10198mm NA 0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | PHASE PLATE SURFACE; OBJECT SIDE | ∞ | 0.5 | PLASTIC OR EQUIVALENT | 1.520148 | — |
| 4 | PHASE PLATE SURFACE; IMAGE SURFACE SIDE | ∞ | 0.2 | AIR | 1 | — |
| 5 | LENS SURFACE; OBJECT SIDE | ASPHERICAL SURFACE | 2.2 | PLASTIC OR EQUIVALENT | 1.520148 | — |
| 6 | LENS SURFACE; IMAGE SURFACE SIDE | ASPHERICAL SURFACE | 1.540446 | AIR | 1 | — |
| 7 | DISK SURFACE; OBJECT SIDE | ∞ | 0.6 | PC | 1.6235 | — |
| 8 | DISK INFORMATION RECORDING SURFACE | ∞ | — | — | — | — |

Fig. 20

SECOND EMBODIMENT DVD (655nm)

OBJECTIVE LENS FOCAL LENGTH 3.20521mm NA 0.629

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | PHASE PLATE SURFACE; OBJECT SIDE | ∞ | 0.5 | PLASTIC OR EQUIVALENT | 1.502116 | — |
| 4 | PHASE PLATE SURFACE; IMAGE SURFACE SIDE | ∞ | 0.2 | AIR | 1 | — |
| 5 | LENS SURFACE; OBJECT SIDE | ASPHERICAL SURFACE | 2.2 | PLASTIC OR EQUIVALENT | 1.502116 | — |
| 6 | LENS SURFACE; IMAGE SURFACE SIDE | ASPHERICAL SURFACE | 1.632535 | AIR | 1 | — |
| 7 | DISK SURFACE; OBJECT SIDE | ∞ | 0.6 | PC | 1.58 | — |
| 8 | DISK INFORMATION RECORDING SURFACE | ∞ | — | — | — | — |

Fig. 21

SECOND EMBODIMENT CD (790nm)

OBJECTIVE LENS FOCAL LENGTH 3.22629mm NA 0.470

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.033 |
| 3 | PHASE PLATE SURFACE; OBJECT SIDE | ∞ | 0.5 | PLASTIC OR EQUIVALENT | 1.498584 | — |
| 4 | PHASE PLATE SURFACE; IMAGE SURFACE SIDE | ASPHERICAL SURFACE | 0.2 | AIR | 1 | — |
| 5 | LENS SURFACE; OBJECT SIDE | ASPHERICAL SURFACE | 2.2 | PLASTIC OR EQUIVALENT | 1.498584 | — |
| 6 | LENS SURFACE; IMAGE SURFACE SIDE | ∞ | 1.277374 | AIR | 1 | — |
| 7 | DISK SURFACE; OBJECT SIDE | ∞ | 1.2 | PC | 1.57163 | — |
| 8 | DISK INFORMATION RECORDING SURFACE | | — | — | — | — |

Fig. 22

OBJECT SURFACE SIDE: ZONE j = 1 TO 6

| ZONE j | | | | | | | | |
|---|---|---|---|---|---|---|---|---|
| 1 HD-DVD /DVD COMMON USE AREA | R | 1.961147E+00 | C | 5.099057E-01 | K | -7.090390E-01 | | |
| | A4 | 5.386235E-03 | A6 | 4.888431E-04 | A8 | -6.237360E-04 | A10 | 3.191200E-04 |
| | A12 | -7.560035E-05 | A14 | 5.626393E-06 | A16 | 1.778579E-07 | | |
| | | | B | 0 | | | | |
| | | AREA RANGE | SMALL | 0 | | | | |
| | | | LARGE | 0.737960864 | | | | |
| 2 HD-DVD /DVD COMMON USE AREA | R | 1.961648E+00 | C | 5.097755E-01 | K | -7.100525E-01 | | |
| | A4 | 5.398320E-03 | A6 | 4.906442E-04 | A8 | -6.237927E-04 | A10 | 3.191268E-04 |
| | A12 | -7.558985E-05 | A14 | 5.633441E-06 | A16 | 1.760448E-07 | | |
| | | | B | -0.001465054 | | | | |
| | | AREA RANGE | SMALL | 0.737960864 | | | | |
| | | | LARGE | 1.091777235 | | | | |
| 3 HD-DVD /DVD COMMON USE AREA | R | 1.962150E+00 | C | 5.096451E-01 | K | -7.096163E-01 | | |
| | A4 | 5.387312E-03 | A6 | 4.888943E-04 | A8 | -6.223547E-04 | A10 | 3.183041E-04 |
| | A12 | -7.535044E-05 | A14 | 5.606987E-06 | A16 | 1.762100E-07 | | |
| | | | B | -0.002929448 | | | | |
| | | AREA RANGE | SMALL | 1.091777235 | | | | |
| | | | LARGE | 1.2900314 | | | | |
| 4 HD-DVD /DVD COMMON USE AREA | R | 1.962656E+00 | C | 5.095137E-01 | K | -6.925527E-01 | | |
| | A4 | 5.101771E-03 | A6 | 4.650171E-04 | A8 | -6.217329E-04 | A10 | 3.169927E-04 |
| | A12 | -7.501432E-05 | A14 | 5.564983E-06 | A16 | 1.771528E-07 | | |
| | | | B | -0.0043867 | | | | |
| | | AREA RANGE | SMALL | 1.2900314 | | | | |
| | | | LARGE | 1.451311319 | | | | |
| 5 HD-DVD /DVD COMMON USE AREA | R | 1.963159E+00 | C | 5.093831E-01 | K | -7.282527E-01 | | |
| | A4 | 5.690846E-03 | A6 | 5.027422E-04 | A8 | -6.120037E-04 | A10 | 3.137706E-04 |
| | A12 | -7.401611E-05 | A14 | 5.429713E-06 | A16 | 1.840748E-07 | | |
| | | | B | -0.005842117 | | | | |
| | | AREA RANGE | SMALL | 1.451311319 | | | | |
| | | | LARGE | 1.771804925 | | | | |
| 6 HD-DVD /DVD COMMON USE AREA | R | 1.962652E+00 | C | 5.095148E-01 | K | -6.970682E-01 | | |
| | A4 | 5.176762E-03 | A6 | 4.704251E-04 | A8 | -6.208570E-04 | A10 | 3.168182E-04 |
| | A12 | -7.495678E-05 | A14 | 5.557299E-06 | A16 | 1.776457E-07 | | |
| | | | B | -0.004395863 | | | | |
| | | AREA RANGE | SMALL | 1.771804925 | | | | |
| | | | LARGE | 1.875375941 | | | | |

Fig. 23

OBJECT SURFACE SIDE: ZONE j = 7 TO 9

| ZONE j | | | | | | | | | |
|---|---|---|---|---|---|---|---|---|---|
| 7<br>HD-DVD<br>/DVD<br>COMMON USE<br>AREA | R | 1.962149E+00 | C | 5.096454E-01 | K | -7.002375E-01 | | | |
| | A4 | 5.232321E-03 | A6 | 4.767062E-04 | A8 | -6.229808E-04 | A10 | 3.181474E-04 |
| | A12 | -7.533325E-05 | A14 | 5.604273E-06 | A16 | 1.762716E-07 | | |
| | | | B | -0.002931692 | | | | |
| | | AREA RANGE | SMALL | 1.875375941 | | | | |
| | | | LARGE | 1.937569703 | | | | |
| 8<br>HD-DVD<br>/DVD<br>COMMON USE<br>AREA | R | 1.961647E+00 | C | 5.097757E-01 | K | -7.168689E-01 | | | |
| | A4 | 5.511603E-03 | A6 | 4.982653E-04 | A8 | -6.224485E-04 | A10 | 3.187726E-04 |
| | A12 | -7.547323E-05 | A14 | 5.616545E-06 | A16 | 1.771124E-07 | | |
| | | | B | -0.00146232 | | | | |
| | | AREA RANGE | SMALL | 1.937569703 | | | | |
| | | | LARGE | 1.984216961 | | | | |
| 9<br>HD-DVD<br>/DVD<br>COMMON USE<br>AREA | R | 1.961148E+00 | C | 5.099055E-01 | K | -7.014857E-01 | | | |
| | A4 | 5.261809E-03 | A6 | 4.777908E-04 | A8 | -6.230359E-04 | A10 | 3.183580E-04 |
| | A12 | -7.540229E-05 | A14 | 5.596599E-06 | A16 | 1.795788E-07 | | |
| | | | B | 5.12027E-06 | | | | |
| | | AREA RANGE | SMALL | 1.984216961 | | | | |
| | | | LARGE | 2.016 | | | | |

Fig. 24

IMAGE SURFACE SIDE

| R2 | R | -5.608087E+00 | C | -1.783139E-01 | K | -5.506429E+01 | | |
|---|---|---|---|---|---|---|---|---|
| | A4 | 4.689891E-03 | A6 | -2.015207E-03 | A8 | -1.091107E-04 | A10 | 1.343906E-04 |
| | A12 | 7.694800E-06 | A14 | -8.013337E-06 | A16 | 8.706881E-07 | | |
| | | | B | 0 | | | | |
| | | AREA RANGE | SMALL | 0 | | | | |
| | | | LARGE | 1.675647 | | | | |

Fig. 25

DIFFERENCE IN OPTICAL PATH LENGTH (λ)
BETWEEN ZONE 1 AND ZONE 2 TO 9

| ZONE j | OPTICAL PATH LENGTH DIFFERENCE FROM ZONE 1 | | |
|---|---|---|---|
| | WAVELENGTH 405nm, HD DVD | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 6 | 3 | - |
| 7 | 4 | 2 | - |
| 8 | 2 | 1 | - |
| 9 | 0 | 0 | - |

Fig. 26

| ZONE m | ZONE RANGE (mm) | | ZONE DEPTH D (mm) |
|---|---|---|---|
| | $b_{m-1}$ | $b_m$ | |
| 1 | 0 | 0.268128 | 0.000000E+00 |
| 2 | 0.268128 | 0.385056 | 7.786245E-03 |
| 3 | 0.385056 | 0.48384 | 1.557249E-02 |
| 4 | 0.48384 | 0.570528 | 2.335874E-02 |
| 5 | 0.570528 | 0.657216 | 3.114498E-02 |
| 6 | 0.657216 | 0.743904 | 3.893123E-02 |
| 7 | 0.743904 | 0.838656 | 4.671747E-02 |
| 8 | 0.838656 | 0.963648 | 5.450372E-02 |
| 9 | 0.963648 | 1.203552 | 6.228996E-02 |
| 10 | 1.203552 | 1.29024 | 5.450372E-02 |
| 11 | 1.29024 | 1.344672 | 4.671747E-02 |
| 12 | 1.344672 | 1.387008 | 3.893123E-02 |
| 13 | 1.387008 | 1.42128 | 3.114498E-02 |
| 14 | 1.42128 | 1.45152 | 2.335874E-02 |
| 15 | 1.45152 | 1.477728 | 1.557249E-02 |
| 16 | 1.477728 | 1.499904 | 7.786245E-03 |
| 17 | 1.499904 | 1.51612 | 0.000000E+00 |
| 18 | 1.51612 | 2.016 | 0.000000E+00 |

Fig. 27

THIRD EMBODIMENT Blu-Ray (BLUE; 405nm)
OBJECTIVE LENS FOCAL LENGTH 2.06045mm NA 0.849

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.5 |
| 3 | PHASE PLATE SURFACE; OBJECT SIDE | ∞ | 0.5 | PLASTIC OR EQUIVALENT | 1.520148 | — |
| 4 | PHASE PLATE SURFACE; IMAGE SURFACE SIDE | ∞ | 0 | AIR | 1 | — |
| 5 | LENS SURFACE; OBJECT SIDE | ASPHERICAL SURFACE | 2.1 | GLASS OR EQUIVALENT | 1.83944 | — |
| 6 | LENS SURFACE; IMAGE SURFACE SIDE | ASPHERICAL SURFACE | 0.779074 | AIR | 1 | — |
| 7 | DISK SURFACE; OBJECT SIDE | ∞ | 0.0875 | PC | 1.6235 | — |
| 8 | DISK INFORMATION RECORDING SURFACE | ∞ | — | — | — | — |

Fig. 34

THIRD EMBODIMENT DVD (655nm)

OBJECTIVE LENS FOCAL LENGTH 2.17158mm NA 0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 2.823 |
| 3 | PHASE PLATE SURFACE; OBJECT SIDE | ∞ | 0.5 | PLASTIC OR EQUIVALENT | 1.502116 | — |
| 4 | PHASE PLATE SURFACE; IMAGE SURFACE SIDE | ∞ | 0 | AIR | 1 | — |
| 5 | LENS SURFACE; OBJECT SIDE | ASPHERICAL SURFACE | 2.1 | GLASS OR EQUIVALENT | 1.7989 | — |
| 6 | LENS SURFACE; IMAGE SURFACE SIDE | ASPHERICAL SURFACE | 0.553303 | AIR | 1 | — |
| 7 | DISK SURFACE; OBJECT SIDE | ∞ | 0.6 | PC | 1.58 | — |
| 8 | DISK INFORMATION RECORDING SURFACE | ∞ | — | — | — | — |

Fig. 35

THIRD EMBODIMENT CD (790nm)

OBJECTIVE LENS FOCAL LENGTH 2.19283mm NA 0.510

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 2.236 |
| 3 | PHASE PLATE SURFACE; OBJECT SIDE | ∞ | 0.5 | PLASTIC OR EQUIVALENT | 1.498584 | — |
| 4 | PHASE PLATE SURFACE; IMAGE SURFACE SIDE | ∞ | 0 | AIR | 1 | — |
| 5 | LENS SURFACE; OBJECT SIDE | ASPHERICAL SURFACE | 2.1 | GLASS OR EQUIVALENT | 1.7916 | — |
| 6 | LENS SURFACE; IMAGE SURFACE SIDE | ASPHERICAL SURFACE | 0.279925 | AIR | 1 | — |
| 7 | DISK SURFACE; OBJECT SIDE | ∞ | 1.2 | PC | 1.573 | — |
| 8 | DISK INFORMATION RECORDING SURFACE | ∞ | — | — | — | — |

Fig. 36

OBJECT SURFACE SIDE: ZONE j = 1 TO 6

| ZONE j | | | | | | | | |
|---|---|---|---|---|---|---|---|---|
| 1 BLU-RAY /DVD COMMON USE AREA | R | -5.11829E+03 | C | -1.95378E-04 | K | 4.02961E+05 | | |
| | A4 | 2.26413E-03 | A6 | -2.07019E-03 | A8 | 3.03181E-04 | A10 | 1.28961E-03 |
| | A12 | -9.22559E-04 | A14 | 2.48899E-04 | A16 | -2.38852E-05 | | |
| | | | B | 0 | | | | |
| | | RANGE OF h | SMALL | 0 | | | | |
| | | | LARGE | 0.21327484 | | | | |
| 2 BLU-RAY /DVD COMMON USE AREA | R | -1.74329E+22 | C | -5.73627E-23 | K | -9.40302E+23 | | |
| | A4 | 1.60141E-03 | A6 | -3.95865E-04 | A8 | -1.81334E-03 | A10 | 2.76771E-03 |
| | A12 | -1.50199E-03 | A14 | 3.68345E-04 | A16 | -3.39625E-05 | | |
| | | | B | -0.001467984 | | | | |
| | | RANGE OF h | SMALL | 0.21327484 | | | | |
| | | | LARGE | 0.315093648 | | | | |
| 3 BLU-RAY /DVD COMMON USE AREA | R | -4.52932E+24 | C | -2.20784E-25 | K | -7.19592E+23 | | |
| | A4 | 1.61121E-03 | A6 | -4.39272E-04 | A8 | -1.74037E-03 | A10 | 2.70683E-03 |
| | A12 | -1.47503E-03 | A14 | 3.62271E-04 | A16 | -3.34144E-05 | | |
| | | | B | -0.002919159 | | | | |
| | | RANGE OF h | SMALL | 0.315093648 | | | | |
| | | | LARGE | 0.38533561 | | | | |
| 4 BLU-RAY /DVD COMMON USE AREA | R | 8.83878E+25 | C | 1.13138E-26 | K | -2.23464E+25 | | |
| | A4 | 1.60084E-03 | A6 | -3.92832E-04 | A8 | -1.81929E-03 | A10 | 2.77326E-03 |
| | A12 | -1.50467E-03 | A14 | 3.68989E-04 | A16 | -3.40233E-05 | | |
| | | | B | -0.004381197 | | | | |
| | | RANGE OF h | SMALL | 0.38533561 | | | | |
| | | | LARGE | 0.446933661 | | | | |
| 5 BLU-RAY /DVD COMMON USE AREA | R | -5.21035E+23 | C | -1.91926E-24 | K | -1.02031E+24 | | |
| | A4 | 1.60199E-03 | A6 | -3.96854E-04 | A8 | -1.81404E-03 | A10 | 2.76996E-03 |
| | A12 | -1.50362E-03 | A14 | 3.68830E-04 | A16 | -3.40150E-05 | | |
| | | | B | -0.005842849 | | | | |
| | | RANGE OF h | SMALL | 0.446933661 | | | | |
| | | | LARGE | 0.510904385 | | | | |
| 6 BLU-RAY /DVD COMMON USE AREA | R | -1.15962E+26 | C | -8.62348E-27 | K | -8.76266E+23 | | |
| | A4 | 1.61346E-03 | A6 | -4.51565E-04 | A8 | -1.71637E-03 | A10 | 2.68430E-03 |
| | A12 | -1.46402E-03 | A14 | 3.59573E-04 | A16 | -3.31519E-05 | | |
| | | | B | -0.00729173 | | | | |
| | | RANGE OF h | SMALL | 0.510904385 | | | | |
| | | | LARGE | 0.563781976 | | | | |

Fig. 37

OBJECT SURFACE SIDE: ZONE j = 7 TO 12

| ZONE j | | | | | | | | |
|---|---|---|---|---|---|---|---|---|
| 7<br>BLU-RAY<br>/DVD<br>COMMON<br>USE AREA | R | -2.27115E+24 | C | -4.40306E-25 | K | -7.59434E+23 | | |
| | A4 | 1.60043E-03 | A6 | -3.92569E-04 | A8 | -1.81763E-03 | A10 | 2.77037E-03 |
| | A12 | -1.50280E-03 | A14 | 3.68446E-04 | A16 | -3.39638E-05 | | |
| | | | B | -0.008753874 | | | | |
| | | RANGE OF h | SMALL | 0.563781976 | | | | |
| | | | LARGE | 0.614870716 | | | | |
| 8<br>BLU-RAY<br>/DVD<br>COMMON<br>USE AREA | R | -3.39488E+23 | C | -2.94561E-24 | K | -8.77326E+23 | | |
| | A4 | 1.65331E-03 | A6 | -6.30035E-04 | A8 | -1.41286E-03 | A10 | 2.42817E-03 |
| | A12 | -1.34927E-03 | A14 | 3.33430E-04 | A16 | -3.07668E-05 | | |
| | | | B | -0.010217034 | | | | |
| | | RANGE OF h | SMALL | 0.614870716 | | | | |
| | | | LARGE | 0.665170936 | | | | |
| 9<br>BLU-RAY<br>/DVD<br>COMMON<br>USE AREA | R | -1.05726E+21 | C | -9.45838E-22 | K | -4.62669E+23 | | |
| | A4 | 1.60413E-03 | A6 | -4.07461E-04 | A8 | -1.79486E-03 | A10 | 2.75303E-03 |
| | A12 | -1.49575E-03 | A14 | 3.66984E-04 | A16 | -3.38414E-05 | | |
| | | | B | -0.011677848 | | | | |
| | | RANGE OF h | SMALL | 0.665170936 | | | | |
| | | | LARGE | 0.715658349 | | | | |
| 10<br>BLU-RAY<br>/DVD<br>COMMON<br>USE AREA | R | -3.59831E+23 | C | -2.77908E-24 | K | -8.62654E+23 | | |
| | A4 | 1.60155E-03 | A6 | -3.96029E-04 | A8 | -1.81413E-03 | A10 | 2.76913E-03 |
| | A12 | -1.50289E-03 | A14 | 3.68592E-04 | A16 | -3.39863E-05 | | |
| | | | B | -0.013136973 | | | | |
| | | RANGE OF h | SMALL | 0.715658349 | | | | |
| | | | LARGE | 0.760183327 | | | | |
| 11<br>BLU-RAY<br>/DVD<br>COMMON<br>USE AREA | R | -2.74374E+22 | C | -3.64466E-23 | K | -2.32260E+23 | | |
| | A4 | 1.61375E-03 | A6 | -4.52555E-04 | A8 | -1.71544E-03 | A10 | 2.68408E-03 |
| | A12 | -1.46414E-03 | A14 | 3.59636E-04 | A16 | -3.31593E-05 | | |
| | | | B | -0.014606151 | | | | |
| | | RANGE OF h | SMALL | 0.760183327 | | | | |
| | | | LARGE | 0.806766094 | | | | |
| 12<br>BLU-RAY<br>/DVD<br>COMMON<br>USE AREA | R | -8.89774E+22 | C | -1.12388E-23 | K | -7.45078E+23 | | |
| | A4 | 1.60286E-03 | A6 | -4.02908E-04 | A8 | -1.80112E-03 | A10 | 2.75725E-03 |
| | A12 | -1.49722E-03 | A14 | 3.67232E-04 | A16 | -3.38563E-05 | | |
| | | | B | -0.01607016 | | | | |
| | | RANGE OF h | SMALL | 0.806766094 | | | | |
| | | | LARGE | 0.857216782 | | | | |

Fig. 38

OBJECT SURFACE SIDE: ZONE j = 13 TO 18

| ZONE j | | | | | | | | |
|---|---|---|---|---|---|---|---|---|
| 13 BLU-RAY /DVD COMMON USE AREA | R | -4.95138E+25 | C | -2.01964E-26 | K | -2.36173E+25 | | |
| | A4 | 1.77107E-03 | A6 | -1.16058E-03 | A8 | -5.05897E-04 | A10 | 1.65933E-03 |
| | A12 | -1.00348E-03 | A14 | 2.54371E-04 | A16 | -2.35311E-05 | | |
| | | | B | -0.017524287 | | | | |
| | RANGE OF h | | SMALL | 0.857216782 | | | | |
| | | | LARGE | 0.915586244 | | | | |
| 14 BLU-RAY /DVD COMMON USE AREA | R | -3.81730E+23 | C | -2.61965E-24 | K | -6.73200E+23 | | |
| | A4 | 1.64904E-03 | A6 | -6.07328E-04 | A8 | -1.45682E-03 | A10 | 2.46905E-03 |
| | A12 | -1.36901E-03 | A14 | 3.38198E-04 | A16 | -3.12214E-05 | | |
| | | | B | -0.018968633 | | | | |
| | RANGE OF h | | SMALL | 0.915586244 | | | | |
| | | | LARGE | 0.968154802 | | | | |
| 15 BLU-RAY /DVD COMMON USE AREA | R | -1.29451E+27 | C | -7.72491E-28 | K | -5.80353E+23 | | |
| | A4 | 1.60368E-03 | A6 | -4.06486E-04 | A8 | -1.79538E-03 | A10 | 2.75269E-03 |
| | A12 | -1.49529E-03 | A14 | 3.66812E-04 | A16 | -3.38190E-05 | | |
| | | | B | -0.020433602 | | | | |
| | RANGE OF h | | SMALL | 0.968154802 | | | | |
| | | | LARGE | 1.035547435 | | | | |
| 16 BLU-RAY /DVD COMMON USE AREA | R | -1.20574E+23 | C | -8.29364E-24 | K | -5.47482E+23 | | |
| | A4 | 1.59959E-03 | A6 | -3.87209E-04 | A8 | -1.82960E-03 | A10 | 2.78258E-03 |
| | A12 | -1.50907E-03 | A14 | 3.70026E-04 | A16 | -3.41178E-05 | | |
| | | | B | -0.021893179 | | | | |
| | RANGE OF h | | SMALL | 1.035547435 | | | | |
| | | | LARGE | 1.176790297 | | | | |
| 17 BLU-RAY /DVD COMMON USE AREA | R | -1.63389E+23 | C | -6.12038E-24 | K | -7.56430E+23 | | |
| | A4 | 1.61748E-03 | A6 | -4.66561E-04 | A8 | -1.69553E-03 | A10 | 2.67000E-03 |
| | A12 | -1.45883E-03 | A14 | 3.58617E-04 | A16 | -3.30801E-05 | | |
| | | | B | -0.020426245 | | | | |
| | RANGE OF h | | SMALL | 1.176790297 | | | | |
| | | | LARGE | 1.21485 | | | | |
| 18 BLU-RAY /DVD COMMON USE AREA | R | -2.53103E+24 | C | -3.95095E-25 | K | -7.83078E+23 | | |
| | A4 | 1.60209E-03 | A6 | -3.98569E-04 | A8 | -1.80988E-03 | A10 | 2.76561E-03 |
| | A12 | -1.50133E-03 | A14 | 3.68237E-04 | A16 | -3.39530E-05 | | |
| | | | B | -0.018962525 | | | | |
| | RANGE OF h | | SMALL | 0.21035 | | | | |
| | | | LARGE | 1.246452534 | | | | |

Fig. 39

OBJECT SURFACE SIDE: ZONE j = 19 TO 24

| ZONE j | | | | | | | |
|---|---|---|---|---|---|---|---|
| 19 BLU-RAY /DVD COMMON USE AREA | R | -7.31854E+26 | C | -1.36639E-27 | K | -2.11837E+25 | |
| | A4 | 1.59960E-03 | A6 | -3.87894E-04 | A8 | -1.82751E-03 | A10 | 2.78027E-03 |
| | A12 | -1.50787E-03 | A14 | 3.69728E-04 | A16 | -3.40901E-05 | |
| | | | B | -0.017501543 | | | |
| | | RANGE OF h | SMALL | 1.246452534 | | | |
| | | | LARGE | 1.270419197 | | | |
| 20 BLU-RAY /DVD COMMON USE AREA | R | 8.24498E+26 | C | 1.21286E-27 | K | -2.17346E+25 | |
| | A4 | 1.79014E-03 | A6 | -1.24611E-03 | A8 | -3.60041E-04 | A10 | 1.53584E-03 |
| | A12 | -9.47977E-04 | A14 | 2.41687E-04 | A16 | -2.23709E-05 | |
| | | | B | -0.016042694 | | | |
| | | RANGE OF h | SMALL | 1.270419197 | | | |
| | | | LARGE | 1.290926712 | | | |
| 21 BLU-RAY /DVD COMMON USE AREA | R | -3.60607E+22 | C | -2.77310E-23 | K | -6.72084E+23 | |
| | A4 | 1.63791E-03 | A6 | -5.60132E-04 | A8 | -1.53315E-03 | A10 | 2.53063E-03 |
| | A12 | -1.39552E-03 | A14 | 3.44025E-04 | A16 | -3.17368E-05 | |
| | | | B | -0.014585292 | | | |
| | | RANGE OF h | SMALL | 1.290926712 | | | |
| | | | LARGE | 1.309006372 | | | |
| 22 BLU-RAY /DVD COMMON USE AREA | R | -1.52012E+22 | C | -6.57844E-23 | K | -1.24009E+24 | |
| | A4 | 1.60139E-03 | A6 | -3.94796E-04 | A8 | -1.81697E-03 | A10 | 2.77206E-03 |
| | A12 | -1.50441E-03 | A14 | 3.68977E-04 | A16 | -3.40246E-05 | |
| | | | B | -0.013128849 | | | |
| | | RANGE OF h | SMALL | 1.309006372 | | | |
| | | | LARGE | 1.325257187 | | | |
| 23 BLU-RAY /DVD COMMON USE AREA | R | -9.52874E+21 | C | -1.04946E-22 | K | -1.26500E+23 | |
| | A4 | 1.59651E-03 | A6 | -3.75265E-04 | A8 | -1.84685E-03 | A10 | 2.79492E-03 |
| | A12 | -1.51375E-03 | A14 | 3.70932E-04 | A16 | -3.41893E-05 | |
| | | | B | -0.011672725 | | | |
| | | RANGE OF h | SMALL | 1.325257187 | | | |
| | | | LARGE | 1.340073995 | | | |
| 24 BLU-RAY /DVD COMMON USE AREA | R | -2.27849E+25 | C | -4.38887E-26 | K | -2.30022E+25 | |
| | A4 | 1.75689E-03 | A6 | -1.09757E-03 | A8 | -6.12372E-04 | A10 | 1.74881E-03 |
| | A12 | -1.04348E-03 | A14 | 2.63484E-04 | A16 | -2.43644E-05 | |
| | | | B | -0.010215413 | | | |
| | | RANGE OF h | SMALL | 1.340073995 | | | |
| | | | LARGE | 1.353727494 | | | |

Fig. 40

OBJECT SURFACE SIDE: ZONE j = 25 TO 30

| ZONE j | | | | | | | |
|---|---|---|---|---|---|---|---|
| 25 BLU-RAY /DVD COMMON USE AREA | R | -1.51907E+24 | C | -6.58296E-25 | K | -5.35996E+23 | |
| | A4 | 1.60278E-03 | A6 | -4.01838E-04 | A8 | -1.80364E-03 | A10 2.75985E-03 |
| | A12 | -1.49858E-03 | A14 | 3.67583E-04 | A16 | -3.38929E-05 | |
| | | | B | -0.008761208 | | | |
| | RANGE OF h | | SMALL | 1.353727494 | | | |
| | | | LARGE | 1.366421127 | | | |
| 26 BLU-RAY /DVD COMMON USE AREA | R | -1.47899E+23 | C | -6.76138E-24 | K | -7.84169E+23 | |
| | A4 | 1.62609E-03 | A6 | -5.05306E-04 | A8 | -1.62882E-03 | A10 2.61310E-03 |
| | A12 | -1.43313E-03 | A14 | 3.52731E-04 | A16 | -3.25432E-05 | |
| | | | B | -0.007305387 | | | |
| | RANGE OF h | | SMALL | 1.366421127 | | | |
| | | | LARGE | 1.378297081 | | | |
| 27 BLU-RAY /DVD COMMON USE AREA | R | -2.15594E+23 | C | -4.63834E-24 | K | -9.10429E+23 | |
| | A4 | 1.60252E-03 | A6 | -4.00083E-04 | A8 | -1.80741E-03 | A10 2.76357E-03 |
| | A12 | -1.50045E-03 | A14 | 3.68052E-04 | A16 | -3.39395E-05 | |
| | | | B | -0.005850076 | | | |
| | RANGE OF h | | SMALL | 1.378297081 | | | |
| | | | LARGE | 1.389472416 | | | |
| 28 BLU-RAY /DVD COMMON USE AREA | R | -5.53131E+28 | C | -1.80789E-29 | K | -1.00513E+38 | |
| | A4 | 1.61614E-03 | A6 | -4.61824E-04 | A8 | -1.70124E-03 | A10 2.67318E-03 |
| | A12 | -1.45967E-03 | A14 | 3.58706E-04 | A16 | -3.30832E-05 | |
| | | | B | -0.004394377 | | | |
| | RANGE OF h | | SMALL | 1.389472416 | | | |
| | | | LARGE | 1.400037565 | | | |
| 29 BLU-RAY /DVD COMMON USE AREA | R | 5.79415E+26 | C | 1.72588E-27 | K | -1.14341E+24 | |
| | A4 | 1.63520E-03 | A6 | -5.47255E-04 | A8 | -1.55576E-03 | A10 2.55025E-03 |
| | A12 | -1.40454E-03 | A14 | 3.46139E-04 | A16 | -3.19366E-05 | |
| | | | B | -0.002938654 | | | |
| | RANGE OF h | | SMALL | 1.400037565 | | | |
| | | | LARGE | 1.410066041 | | | |
| 30 BLU-RAY /DVD COMMON USE AREA | R | -5.82093E+24 | C | -1.71794E-25 | K | -2.26472E+25 | |
| | A4 | 1.73231E-03 | A6 | -9.86100E-04 | A8 | -8.03651E-04 | A10 1.91148E-03 |
| | A12 | -1.11687E-03 | A14 | 2.80317E-04 | A16 | -2.59108E-05 | |
| | | | B | -0.001482187 | | | |
| | RANGE OF h | | SMALL | 1.410066041 | | | |
| | | | LARGE | 1.419619331 | | | |

Fig. 41

OBJECT SURFACE SIDE: ZONE j = 31

| ZONE j | | | | | | | |
|---|---|---|---|---|---|---|---|
| 31 BLU-RAY EXCLUSIVE USE AREA | R | 1.05173E+289 | C | 9.50814E-290 | K | 1.24672E+288 | |
| | A4 | 5.50946E-03 | A6 | -3.71016E-03 | A8 | -6.19378E-04 | A10 2.12713E-03 |
| | A12 | -1.14648E-03 | A14 | 2.66836E-04 | A16 | -2.36474E-05 | |
| | | | B | -4.42314E-05 | | | |
| | RANGE OF h | | SMALL | 1.419619331 | | | |
| | | | LARGE | 1.75 | | | |

Fig. 42

DIFFERENCE IN OPTICAL PATH LENGTH (λ) BETWEEN ZONE 1 AND ZONE 2 TO 31

| ZONE j | OPTICAL PATH LENGTH DIFFERENCE FROM ZONE 1 | | |
|---|---|---|---|
| | WAVELENGTH 405nm, BLU-RAY | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 10 | 5 | 5 |
| 7 | 12 | 6 | 6 |
| 8 | 14 | 7 | 7 |
| 9 | 16 | 8 | 8 |
| 10 | 18 | 9 | 9 |
| 11 | 20 | 10 | 10 |
| 12 | 22 | 11 | 11 |
| 13 | 24 | 12 | 12 |
| 14 | 26 | 13 | 13 |
| 15 | 28 | 14 | 14 |
| 16 | 30 | 15 | 15 |
| 17 | 28 | 14 | — |
| 18 | 26 | 13 | — |
| 19 | 24 | 12 | — |
| 20 | 22 | 11 | — |
| 21 | 20 | 10 | — |
| 22 | 18 | 9 | — |
| 23 | 16 | 8 | — |
| 24 | 14 | 7 | — |
| 25 | 12 | 6 | — |
| 26 | 10 | 5 | — |
| 27 | 8 | 4 | — |
| 28 | 6 | 3 | — |
| 29 | 4 | 2 | — |
| 30 | 2 | 1 | — |
| 31 | 0 | — | — |

Fig. 43

IMAGE SURFACE SIDE: ZONE j = 1 TO 24

| ZONE m | ZONE RANGE (mm) | | ZONE DEPTH D (mm) |
|---|---|---|---|
| | bm-1 | bm | |
| 1 | 0 | 0.16835 | 0.000000E+00 |
| 2 | 0.16835 | 0.24185 | -7.786245E-03 |
| 3 | 0.24185 | 0.30135 | -1.557249E-02 |
| 4 | 0.30135 | 0.3542 | -2.335874E-02 |
| 5 | 0.3542 | 0.40355 | -3.114498E-02 |
| 6 | 0.40355 | 0.4508 | -3.893123E-02 |
| 7 | 0.4508 | 0.49735 | -4.671747E-02 |
| 8 | 0.49735 | 0.54425 | -5.450372E-02 |
| 9 | 0.54425 | 0.59255 | -6.228996E-02 |
| 10 | 0.59255 | 0.6447 | -7.007621E-02 |
| 11 | 0.6447 | 0.7063 | -7.786245E-02 |
| 12 | 0.7063 | 0.92925 | -8.564870E-02 |
| 13 | 0.92925 | 0.96775 | -7.786245E-02 |
| 14 | 0.96775 | 0.9954 | -7.007621E-02 |
| 15 | 0.9954 | 1.0178 | -6.228996E-02 |
| 16 | 1.0178 | 1.0367 | -5.450372E-02 |
| 17 | 1.0367 | 1.05315 | -4.671747E-02 |
| 18 | 1.05315 | 1.0682 | -3.893123E-02 |
| 19 | 1.0682 | 1.08185 | -3.114498E-02 |
| 20 | 1.08185 | 1.0941 | -2.335874E-02 |
| 21 | 1.0941 | 1.10565 | -1.557249E-02 |
| 22 | 1.10565 | 1.1165 | -7.786245E-03 |
| 23 | 1.1165 | 1.1181189 | 0.000000E+00 |
| 24 | 1.1181189 | 1.75 | 0.000000E+00 |

Fig. 44

OBJECT SURFACE SIDE

| R1 | R | 1.60684E+00 | C | 6.22340E-01 | K | -1.35583E+00 | | |
|---|---|---|---|---|---|---|---|---|
| | A4 | 2.91515E-02 | A6 | 5.22117E-03 | A8 | -5.25981E-03 | A10 | 4.44913E-03 |
| | A12 | -2.01350E-03 | A14 | 5.10837E-04 | A16 | -5.60591E-05 | | |
| | | | B | 0 | | | | |
| | RANGE OF h | | SMALL | 0 | | | | |
| | | | LARGE | 1.75 | | | | |

IMAGE SURFACE SIDE

| R2 | R | 9.15901E+00 | C | 1.09182E-01 | K | 2.04226E+01 | | |
|---|---|---|---|---|---|---|---|---|
| | A4 | 8.21764E-02 | A6 | -1.99199E-01 | A8 | 3.51911E-01 | A10 | -4.09289E-01 |
| | A12 | 2.77640E-01 | A14 | -1.01147E-01 | A16 | 1.53481E-02 | | |
| | | | B | 0 | | | | |
| | RANGE OF h | | SMALL | 0 | | | | |
| | | | LARGE | 1.090452 | | | | |

| α | D (μm) | OPD λ1 (μm) | OPD λ1 (λ) | αλ1 | Error λ1 | OPD λ2 (μm) | OPD λ2 (λ) | αλ2 | Error λ2 | OPD λ3 (μm) | OPD λ3 (λ) | αλ3 | Error λ3 |
|---|---|---|---|---|---|---|---|---|---|---|---|---|---|
| 9.88 | 7.6928 | 4.0014 | 9.8800 | 10 | 0.1200 | 3.8627 | 5.8972 | 6 | 0.1028 | 3.8355 | 4.8551 | 5 | 0.1449 |
| 9.90 | 7.7084 | 4.0095 | 9.9000 | 10 | 0.1000 | 3.8705 | 5.9092 | 6 | 0.0908 | 3.8433 | 4.8649 | 5 | 0.1351 |
| 9.92 | 7.7240 | 4.0176 | 9.9200 | 10 | 0.0800 | 3.8783 | 5.9211 | 6 | 0.0789 | 3.8510 | 4.8747 | 5 | 0.1253 |
| 9.94 | 7.7395 | 4.0257 | 9.9400 | 10 | 0.0600 | 3.8861 | 5.9330 | 6 | 0.0670 | 3.8588 | 4.8846 | 5 | 0.1154 |
| 9.96 | 7.7551 | 4.0338 | 9.9600 | 10 | 0.0400 | 3.8940 | 5.9450 | 6 | 0.0550 | 3.8666 | 4.8944 | 5 | 0.1056 |
| 9.98 | 7.7707 | 4.0419 | 9.9800 | 10 | 0.0200 | 3.9018 | 5.9569 | 6 | 0.0431 | 3.8743 | 4.9042 | 5 | 0.0958 |
| 10.00 | 7.7862 | 4.0500 | 10.0000 | 10 | 0.0000 | 3.9096 | 5.9689 | 6 | 0.0311 | 3.8821 | 4.9140 | 5 | 0.0860 |
| 10.02 | 7.8018 | 4.0581 | 10.0200 | 10 | -0.0200 | 3.9174 | 5.9808 | 6 | 0.0192 | 3.8899 | 4.9239 | 5 | 0.0761 |
| 10.04 | 7.8174 | 4.0662 | 10.0400 | 10 | -0.0400 | 3.9252 | 5.9927 | 6 | 0.0073 | 3.8976 | 4.9337 | 5 | 0.0663 |
| 10.06 | 7.8330 | 4.0743 | 10.0600 | 10 | -0.0600 | 3.9331 | 6.0047 | 6 | -0.0047 | 3.9054 | 4.9435 | 5 | 0.0565 |
| 10.08 | 7.8485 | 4.0824 | 10.0800 | 10 | -0.0800 | 3.9409 | 6.0166 | 6 | -0.0166 | 3.9132 | 4.9534 | 5 | 0.0466 |
| 10.10 | 7.8641 | 4.0905 | 10.1000 | 10 | -0.1000 | 3.9487 | 6.0285 | 6 | -0.0285 | 3.9209 | 4.9632 | 5 | 0.0368 |
| 10.12 | 7.8797 | 4.0986 | 10.1200 | 10 | -0.1200 | 3.9565 | 6.0405 | 6 | -0.0405 | 3.9287 | 4.9730 | 5 | 0.0270 |
| 10.14 | 7.8953 | 4.1067 | 10.1400 | 10 | -0.1400 | 3.9643 | 6.0524 | 6 | -0.0524 | 3.9364 | 4.9828 | 5 | 0.0172 |
| 10.16 | 7.9108 | 4.1148 | 10.1600 | 10 | -0.1600 | 3.9722 | 6.0644 | 6 | -0.0644 | 3.9442 | 4.9927 | 5 | 0.0073 |
| 10.18 | 7.9264 | 4.1229 | 10.1800 | 10 | -0.1800 | 3.9800 | 6.0763 | 6 | -0.0763 | 3.9520 | 5.0025 | 5 | -0.0025 |
| 10.20 | 7.9420 | 4.1310 | 10.2000 | 10 | -0.2000 | 3.9878 | 6.0882 | 6 | -0.0882 | 3.9597 | 5.0123 | 5 | -0.0123 |
| 10.22 | 7.9575 | 4.1391 | 10.2200 | 10 | -0.2200 | 3.9956 | 6.1002 | 6 | -0.1002 | 3.9675 | 5.0222 | 5 | -0.0222 |
| DETERMINATION REFERENCE | | | | | < |0.1| | | | | < |0.1| | | | |

Fig. 47

| α | D (μm) | OPD λ1 (μm) | OPD λ1 (λ) | αλ1 | Error λ1 | OPD λ2 (μm) | OPD λ2 (λ) | αλ2 | Error λ2 | OPD λ3 (μm) | OPD λ3 (λ) | αλ3 | Error λ3 |
|---|---|---|---|---|---|---|---|---|---|---|---|---|---|
| 19.88 | 15.4791 | 8.0514 | 19.8800 | 20 | 0.1200 | 7.7723 | 11.8661 | 12 | 0.1339 | 7.7176 | 9.7691 | 10 | 0.2309 |
| 19.90 | 15.4946 | 8.0595 | 19.9000 | 20 | 0.1000 | 7.7801 | 11.8780 | 12 | 0.1220 | 7.7254 | 9.7790 | 10 | 0.2210 |
| 19.92 | 15.5102 | 8.0676 | 19.9200 | 20 | 0.0800 | 7.7879 | 11.8900 | 12 | 0.1100 | 7.7331 | 9.7888 | 10 | 0.2112 |
| 19.94 | 15.5258 | 8.0757 | 19.9400 | 20 | 0.0600 | 7.7957 | 11.9019 | 12 | 0.0981 | 7.7409 | 9.7986 | 10 | 0.2014 |
| 19.96 | 15.5413 | 8.0838 | 19.9600 | 20 | 0.0400 | 7.8036 | 11.9138 | 12 | 0.0862 | 7.7487 | 9.8084 | 10 | 0.1916 |
| 19.98 | 15.5569 | 8.0919 | 19.9800 | 20 | 0.0200 | 7.8114 | 11.9258 | 12 | 0.0742 | 7.7564 | 9.8183 | 10 | 0.1817 |
| 20.00 | 15.5725 | 8.1000 | 20.0000 | 20 | 0.0000 | 7.8192 | 11.9377 | 12 | 0.0623 | 7.7642 | 9.8281 | 10 | 0.1719 |
| 20.02 | 15.5881 | 8.1081 | 20.0200 | 20 | -0.0200 | 7.8270 | 11.9496 | 12 | 0.0504 | 7.7720 | 9.8379 | 10 | 0.1621 |
| 20.04 | 15.6036 | 8.1162 | 20.0400 | 20 | -0.0400 | 7.8348 | 11.9616 | 12 | 0.0384 | 7.7797 | 9.8478 | 10 | 0.1522 |
| 20.06 | 15.6192 | 8.1243 | 20.0600 | 20 | -0.0600 | 7.8427 | 11.9735 | 12 | 0.0265 | 7.7875 | 9.8576 | 10 | 0.1424 |
| 20.08 | 15.6348 | 8.1324 | 20.0800 | 20 | -0.0800 | 7.8505 | 11.9855 | 12 | 0.0145 | 7.7953 | 9.8674 | 10 | 0.1326 |
| 20.10 | 15.6504 | 8.1405 | 20.1000 | 20 | -0.1000 | 7.8583 | 11.9974 | 12 | 0.0026 | 7.8030 | 9.8772 | 10 | 0.1228 |
| 20.12 | 15.6659 | 8.1486 | 20.1200 | 20 | -0.1200 | 7.8661 | 12.0093 | 12 | -0.0093 | 7.8108 | 9.8871 | 10 | 0.1129 |
| 20.14 | 15.6815 | 8.1567 | 20.1400 | 20 | -0.1400 | 7.8739 | 12.0213 | 12 | -0.0213 | 7.8185 | 9.8969 | 10 | 0.1031 |
| 20.16 | 15.6971 | 8.1648 | 20.1600 | 20 | -0.1600 | 7.8818 | 12.0332 | 12 | -0.0332 | 7.8263 | 9.9067 | 10 | 0.0933 |
| 20.18 | 15.7126 | 8.1729 | 20.1800 | 20 | -0.1800 | 7.8896 | 12.0451 | 12 | -0.0451 | 7.8341 | 9.9165 | 10 | 0.0835 |
| 20.20 | 15.7282 | 8.1810 | 20.2000 | 20 | -0.2000 | 7.8974 | 12.0571 | 12 | -0.0571 | 7.8418 | 9.9264 | 10 | 0.0736 |
| 20.22 | 15.7438 | 8.1891 | 20.2200 | 20 | -0.2200 | 7.9052 | 12.0690 | 12 | -0.0690 | 7.8496 | 9.9362 | 10 | 0.0638 |
| 20.24 | 15.7594 | 8.1972 | 20.2400 | 20 | -0.2400 | 7.9130 | 12.0810 | 12 | -0.0810 | 7.8574 | 9.9460 | 10 | 0.0540 |
| 20.26 | 15.7749 | 8.2053 | 20.2600 | 20 | -0.2600 | 7.9208 | 12.0929 | 12 | -0.0929 | 7.8651 | 9.9559 | 10 | 0.0441 |
| 20.28 | 15.7905 | 8.2134 | 20.2800 | 20 | -0.2800 | 7.9287 | 12.1048 | 12 | -0.1048 | 7.8729 | 9.9657 | 10 | 0.0343 |
| DETERMINATION REFERENCE | | | | | < |0.1| | | | | < |0.1| | | | |

Fig. 48

PICKUP LENS WITH PHASE COMPENSATOR AND OPTICAL PICKUP APPARATUS USING THE SAME

BACKGROUND OF THE INVENTION

1. Field of the Invention

The present invention relates to a pickup lens with a phase compensator that can be used for a multiwavelength optical system using a plurality of kinds of monochromatic light such as a compatible recording and reproduction apparatus that is compatible with different types of optical recording media such as compact discs (CDs) including CD-R, digital versatile discs (DVDs), Blu-ray and High-Definition DVD (HD-DVD) and an optical pickup using the same.

2. Description of Related Art

Compatible optical disc apparatus capable of recording or reproducing data on different types of optical discs such as CD and DVD with one system have been proposed.

In order to record or reproduce information signals stored on optical discs such as CD and DVD (which is hereinafter collectively called the optical disc), the compatible optical disc apparatus needs to focus a laser beam from a light source on an information recording surface of each optical disc through a transparent substrate. However, the wavelength differs between a laser beam used for recording or reproducing CD and a laser beam used for recording or reproducing DVD. Further, while CD has a transparent substrate of 1.2 mm in thickness, DVD has that of 0.6 mm. Because of aberrations caused by these reasons, use of a conventional condenser lens for both CD and DVD in the compatible optical disc apparatus fails to focus each laser beam used for CD and DVD on the information recording surface of each optical disc close to the diffraction limit.

A recently proposed apparatus compatible with optical discs capable of ultra high density recording, such as Blu-ray and HD-DVD, uses a blue laser with a wavelength of approximately 405 nm for recording and reproduction of information. Therefore, future compatible optical disc apparatus are expected to record or reproduce data on not only CD and DVD but also optical discs for ultra high density recording. Thus, though conventional compatible optical disc apparatus allows for two different light source wavelengths and two different thicknesses of transparent substrates, future compatible optical disc apparatus needs to allow for at most three different light source wavelengths and at most three different thicknesses of transparent substrates.

To meet this need, a compatible optical disc apparatus may have a plurality of condenser lenses to prevent aberrations for different types of optical discs in a pickup so that the condenser lenses are changed in accordance with the type of the optical disc in use. Alternatively, it may have a plurality of pickups for different types of optical discs so that the pickups are changed in accordance with the type of the optical disc in use. However, in terms of cost and size reduction, it is preferred to use one lens as a condenser lens for any type of optical disc.

An example of such a condenser lens is described in Japanese Unexamined Patent Publication No. 2004-6005 (Ota et al.) According to an aspect of Ota et al., a device includes a light source with a wavelength $\lambda_1$ for recording and reproducing information on a second optical medium, a light source with a wavelength $\lambda_2$ ($\lambda_1 < \lambda_2$) for recording and reproducing information on a first optical medium, a light source with a wavelength $\lambda_3$ ($\lambda_2 < \lambda_3$) for recording and reproducing information on a third optical medium having a thicker substrate than the first and the second optical medium, and a condenser lens for focusing a light beam from each light source on each optical medium. This device applies a light beam with the wavelength $\lambda_1$ as parallel light to the condenser lens when recording or reproducing data on the second optical medium. It applies a light beam with the wavelength $\lambda_2$ as parallel light to the condenser lens when recording or reproducing data on the first optical medium. Further, it applies a light beam with the wavelength $\lambda_3$ as divergent light to the condenser lens when recording or reproducing data on the third optical medium.

The condenser lens taught by Ota et al. has a diffractive lens structure where minute annular zone steps are thickly formed on one side surface of a refractive lens having a positive refractive power. The diffractive lens structure is designed so as to focus a laser beam with the wavelength $\lambda_1$ that is incident on the condenser lens as a parallel light beam, which is referred to herein as the infinite system, to an information recording surface of the second optical medium having a substrate of a small thickness and to focus an infinite laser beam with the wavelength $\lambda_2$ to an information recording surface of the first optical medium having a substrate of the same thickness.

On the other hand, since the condenser lens does not allow for the wavelength $\lambda_3$, wavefront aberration occurs when recording or reproducing information on the third optical medium by using a laser beam with the wavelength $\lambda_3$. Thus, the laser beams is not collimated to a parallel beam but is incident on the condenser lens as divergent light, which is referred to herein as the finite system. This technique uses the fact that spherical aberration changes by changing a degree of divergence of the incident light, which is an object distance for the condenser lens in geometric optical terms.

Another example of the condenser lens is described in Japanese Unexamined Patent Publication No. 2004-79146 (Kimura et al.). According to an aspect of Kimura et al., an apparatus includes a light source with a wavelength $\lambda_1$ for recording and reproducing information on a first optical medium, a light source with a wavelength $\lambda_2$ ($\lambda_1 < \lambda_2$) for recording and reproducing information on a second optical medium, a light source with a wavelength $\lambda_3$ ($\lambda_2 < \lambda_3$) for recording and reproducing information on a third optical medium, and a condenser lens for focusing a light beam from each light source on each optical medium. This apparatus applies a light beam with the wavelength $\lambda_1$ as parallel light to the condenser lens when recording or reproducing data on the first optical medium. It applies a light beam with the wavelength $\lambda_2$ as divergent light to the condenser lens when recording or reproducing data on the second optical medium. Further, it applies a light beam with the wavelength $\lambda_3$ as divergent light to the condenser lens when recording or reproducing data on the third optical medium.

This condenser lens has a diffractive lens structure where minute annular zone steps are thickly formed on one side surface of a refractive lens having a positive refractive power just like the above case. This condenser lens, however, is designed so that the wavelength $\lambda_1$ is infinite and the wavelength $\lambda_2$ and $\lambda_3$ are finite. If the wavelength $\lambda_2$ and $\lambda_3$ are finite so as to apply divergent light beams to the second and the third optical disc, it is possible to reduce the aberration that occurs due to a difference in substrate thickness of different kinds of optical discs, which the diffractive structure needs to reduce. This allows increasing the interval between adjacent loop zones and thereby reducing a decrease in diffraction efficiency due to errors in manufacturing the loop zone shape.

According to another aspect of Kimura et al., an apparatus includes a light source with a wavelength $\lambda_1$ for recording and reproducing information on a first optical medium, a light source with a wavelength λ2 (λ1<λ2) for recording and reproducing information on a second optical medium, a light source with a wavelength λ3 (λ2<λ3) for recording and reproducing information on a third optical medium, and a condenser lens for focusing a light beam from each light source on each optical medium. This apparatus applies a light beam with the wavelength λ1 as parallel light to the condenser lens when recording or reproducing data on the first optical medium. It applies a light beam with the wavelength λ2 as parallel light to the condenser lens when recording or reproducing data on the second optical medium. Further, it applies a light beam with the wavelength λ3 as parallel light to the condenser lens when recording or reproducing data on the third optical medium.

This condenser lens is designed so that wavefront aberration is small only for the wavelength λ1 and the substrate thickness of the first optical medium, and it does not have a diffractive lens structure where minute annular zone steps are thickly formed on one side surface of a refractive lens having a positive refractive power. Though the wavefront aberration therefore occurs when recording information on the second optical medium with the wavelength λ2, this technique corrects the wavefront aberration by using a coupling lens having a diffractive structure composed of a plurality of concentric loop zones in a light path through which only the light with the wavelength λ2 passes. Similarly, though the wavefront aberration occurs when recording information on the third optical medium with the wavelength λ3, this technique corrects the wavefront aberration by using a coupling lens having a diffractive structure composed of a plurality of concentric loop zones in a light path through which only the light with the wavelength λ3 passes. As yet another aspect, Kimura et al. describes a technique that uses a dual wavelength laser of wavelengths λ2 and λ3 to share a coupling lens having a diffractive structure composed of a plurality of concentric loop zones in common for the wavelengths λ2 and λ3.

Since the above techniques use a condenser lens in common, it is possible to eliminate the need for means to replace members used for each type of optical disc including condenser lenses, which reduces costs and simplifies the structure.

However, the present invention has recognized that the above techniques have the following problems. Specifically, though the technique taught by Ota et al. corrects aberrations by using the finite system when recording or reproducing information on the third optical medium with the wavelength λ3, it is difficult to share components with the infinite optical system used when recording and reproducing information on the second optical medium with a laser beam of the wavelength λ1 and when recording and reproducing information on the first optical medium with a laser beam of the wavelength λ2. Further, in a case of using a three-wavelength laser having wavelengths of λ1, λ2 and λ3 as one element, it is difficult to make finite system only when recording and reproducing information on the third optical medium with a laser beam of the wavelength λ3, which hinders achievement of a simple optical system. This is the same for the case of making finite system only when recording and reproducing information on the first optical medium with a laser beam of the wavelength λ1 as taught by Kimura et al.

Furthermore, in a case of performing tracking servo by applying divergent light to a condenser lens and mounting the condenser lens onto an actuator, aberrations specific to the finite system that are caused by misalignment of the optical axis of the condenser lens and the optical axis of incident light occur, thereby failing to sufficiently focus laser beams on the information surface of an optical disc.

Kimura et al. also teach the technique to make all the structure with finite system as described above. However, it requires inserting a coupling lens for correcting wavefront aberrations in a light path through which only the light with the wavelength λ2 or λ3 passes. Further, use of the three-wavelength laser complicates the structure of the optical system.

SUMMARY OF THE INVENTION

In view of the foregoing, it is an object of the present invention to solve the above problems. Specifically, an object of the present invention is to provide a pickup lens with a phase compensator that assures low wavefront aberration for each of a plurality of types of optical discs using different wavelengths with a simple optical system and prevents aberrations specific to finite system that is caused by misalignment of the optical axes of a condenser lens and incident light when performing tracking servo by an actuator, and an optical pickup apparatus using the same.

To these ends, according to an aspect of the present invention, there is provided a pickup lens with a phase compensator that is composed of a condenser lens and a phase compensator, wherein at least one surface of the condenser lens has a step-like annular zone structure to compensate wavefront aberration generated when recording and reproducing data on an information recording medium having a substrate thickness of t1 with a laser beam having a wavelength λ1 and wavefront aberration generated when recording and reproducing data on an information recording medium having a substrate thickness of t2 with a laser beam having a wavelength λ2, and the phase compensator compensates wavefront aberration generated when recording and reproducing data on an information recording medium having a substrate thickness of t3 with a laser beam having a wavelength λ3. This structure ensures reduction of wavefront aberration as much as possible for each of three different kinds of information recording media that use wavelengths λ1, λ2 and λ3 with a simple optical system.

The phase compensator may be a liquid crystal aberration correcting element. This allows electrically controlling the operation of the phase compensator, so that the phase compensator surely compensates only the wavefront aberration of a wavelength corresponding thereto.

The phase compensator may be an element having a step-like annular zone structure. In this case, if a refractive index of a phase compensator for a laser beam of a wavelength λ1 is n1, a step D in the annular zone structure of the phase compensator for compensating a phase in CD may be represented by $D=\alpha*\lambda 1/(n1-1)$. In this expression, $\alpha$ is preferably an integer or a value within an integer ±10%.

It is preferred that the wavelength λ1 is substantially 405 nm, the wavelength λ2 is substantially 655 nm, the wavelength λ3 is substantially 790 nm, the substrate thickness t1 is substantially 0.1 mm, the substrate thickness t2 is substantially 0.6 mm, and the substrate thickness t3 is substantially 1.2 mm. Alternatively, it is feasible that the wavelength λ1 is substantially 405 nm, the wavelength λ2 is substantially 655 nm, the wavelength λ3 is substantially 790 nm, the substrate thickness t1 is substantially 0.6 mm, the substrate thickness t2 is substantially 0.6 mm, and the substrate thickness t3 is substantially 1.2 mm. This allows compatibility with different kinds of optical recording media such as CD, DVD, Blu-ray, HD-DVD and so on.

According to another aspect of the present invention, there is provided an optical pickup apparatus for recording and reproducing data on information recording media having a substrate thickness of t1, t2 and t3 with a wavelength of $\lambda 1$, $\lambda 2$ and $\lambda 3$, wherein the optical pickup apparatus records and reproduces data on information recording media by using a pickup lens with a phase compensator that is composed of a condenser lens and a phase compensator. At least one surface of the condenser lens has a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$, and the phase compensator compensates wavefront aberration generated when recording and reproducing data on an information recording medium having a substrate thickness of t3 with a laser beam having a wavelength $\lambda 3$.

The phase compensator may be a liquid crystal aberration correcting element. This allows electrically controlling the operation of the phase compensator, so that the phase compensator surely compensates only the wavefront aberration of a corresponding wavelength.

The phase compensator may be an element having a step-like annular zone structure. In this case, if a refractive index of a phase compensator for a laser beam of a wavelength $\lambda 1$ is n1, a step D in the annular zone structure of the phase compensator for compensating a phase in CD may be represented by $D=\alpha*\lambda 1/(n1-1)$. In this expression, $\alpha$ is preferably an integer or a value within an integer $\pm 10\%$.

It is preferred that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.1 mm, the substrate thickness t2 is substantially 0.6 mm, and the substrate thickness t3 is substantially 1.2 mm. Alternatively, it is feasible that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.6 mm, the substrate thickness t2 is substantially 0.6 mm, and the substrate thickness t3 is substantially 1.2 mm. This allows compatibility with different kinds of optical recording media such as CD, DVD, Blu-ray, HD-DVD and so on.

According to yet another aspect of the present invention, there is provided a pickup lens with a phase compensator that is composed of a condenser lens and a phase compensator, wherein both surfaces of the condenser lens have a continuous aspherical shape, a first surface of the phase compensator has a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$, and a second surface of the phase compensator has a step-like annular zone structure to compensate wavefront aberration generated when recording and reproducing data on an information recording medium having a substrate thickness of t3 with a laser beam having a wavelength $\lambda 3$.

It is preferred that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.1 mm, the substrate thickness t2 is substantially 0.6 mm, and the substrate thickness t3 is substantially 1.2 mm. Alternatively, it is feasible that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.6 mm, the substrate thickness t2 is substantially 0.6 mm, and the substrate thickness t3 is substantially 1.2 mm. This allows compatibility with different kinds of optical recording media such as CD, DVD, Blu-ray, HD-DVD and so on. If a refractive index of a phase compensator for a laser beam of a wavelength $\lambda 1$ is n1, a step D in the annular zone structure of the phase compensator for compensating a phase in CD may be represented by $D=\alpha*\lambda 1/(n1-1)$. In this expression, $\alpha$ is preferably an integer or a value within an integer $\pm 10\%$.

According to still another aspect of the present invention, there is provided an optical pickup apparatus for recording and reproducing data on information recording media having a substrate thickness of t1, t2 and t3 with a wavelength of $\lambda 1$, $\lambda 2$ and $\lambda 3$, wherein the optical pickup apparatus records and reproduces data on information recording media by using a pickup lens with a phase compensator that is composed of a condenser lens and a phase compensator. Both surfaces of the condenser lens have a continuous aspherical shape, a first surface of the phase compensator has a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$, and a second surface of the phase compensator has a step-like annular zone structure to compensate wavefront aberration generated when recording and reproducing data on an information recording medium having a substrate thickness of t3 with a laser beam having a wavelength $\lambda 3$.

It is preferred that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.1 mm, the substrate thickness t2 is substantially 0.6 mm, and the substrate thickness t3 is substantially 1.2 mm. Alternatively, it is feasible that the wavelength $\lambda 1$ is substantially 405 nm, the wavelength $\lambda 2$ is substantially 655 nm, the wavelength $\lambda 3$ is substantially 790 nm, the substrate thickness t1 is substantially 0.6 mm, the substrate thickness t2 is substantially 0.6 mm, and the substrate thickness t3 is substantially 1.2 mm. This allows compatibility with different kinds of optical recording media such as CD, DVD, Blu-ray, HD-DVD and so on. If a refractive index of a phase compensator for a laser beam of a wavelength $\lambda 1$ is n1, a step D in the annular zone structure of the phase compensator for compensating a phase in CD may be represented by $D=\alpha*\lambda 1/(n1-1)$. In this expression, $\alpha$ is preferably an integer or a value within an integer $\pm 10\%$.

The present invention ensures sufficient reduction of aberration for each of different kinds of optical discs with different wavelengths by designing an aspherical shape of a condenser lens and a phase compensation amount by an aberration compensator so as to reduce aberrations between optical paths each passing through a given optical height. Further, since the present invention allows forming an optical system where all laser beams are infinite, it eliminates the need for changing an object distance for a condenser lens with respect to a laser beam having a specific wavelength, thereby achieving a simple optical system with a multi-wavelength laser having a plurality of wavelengths, and it allows sufficiently focusing laser beams onto an information recording surface of an optical disc even when tracking servo is per-formed with an actuator having the lens because aberrations specific to finite system do not occur.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 8 is a view showing lens data of an optical pickup according to the present invention when a disc is HD-DVD;

FIG. 9 is a view showing lens data of an optical pickup according to the present invention when a disc is DVD;

FIG. 10 is a view showing lens data of an optical pickup according to the present invention when a disc is CD;

FIG. 11 is a view showing the figure of a condenser lens according to the present invention;

FIG. 12 is a view showing the figure of a condenser lens according to the present invention;

FIG. 13 is a view showing the figure of a condenser lens according to the present invention;

FIG. 20 is a view showing lens data of an optical pickup according to the present invention when a disc is HD-DVD;

FIG. 21 is a view showing lens data of an optical pickup according to the present invention when a disc is DVD;

FIG. 22 is a view showing lens data of an optical pickup according to the present invention when a disc is CD;

FIG. 23 is a view showing the figure of a condenser lens according to the present invention;

FIG. 24 is a view showing the figure of a condenser lens according to the present invention;

FIG. 25 is a view showing the figure of a condenser lens according to the present invention;

FIG. 26 is a view showing a difference in optical path length in a condenser lens according to the present invention;

FIG. 27 is a view showing the structure of a phase compensator according to the present invention;

FIG. 34 is a view showing lens data of a lens module and a disc according to the present invention;

FIG. 35 is a view showing lens data of a lens module and a disc according to the present invention;

FIG. 36 is a view showing lens data of a lens module and a disc according to the present invention;

FIG. 37 is a view that represents the aspherical shape of a phase compensator according to the present invention by mathematical expression;

FIG. 38 is a view that represents the aspherical shape of a phase compensator according to the present invention by mathematical expression;

FIG. 39 is a view that represents the aspherical shape of a phase compensator according to the present invention by mathematical expression;

FIG. 40 is a view that represents the aspherical shape of a phase compensator according to the present invention by mathematical expression;

FIG. 41 is a view that represents the aspherical shape of a phase compensator according to the present invention by mathematical expression;

FIG. 42 is a view that represents the aspherical shape of a phase compensator according to the present invention by mathematical expression;

FIG. 43 is a view showing a difference in substantial optical path length between a Blu-ray/DVD common use area and a Blu-ray exclusive use area according to the present invention;

FIG. 44 is a view showing the structure of a phase compensator according to the present invention;

FIG. 47 is a table showing a tolerance of α in a phase compensator according to the present invention; and FIG. 48 is a table showing a tolerance of α in a phase compensator according to the present invention.

DESCRIPTION OF THE PREFERRED EMBODIMENTS

First Embodiment

Figure 1:
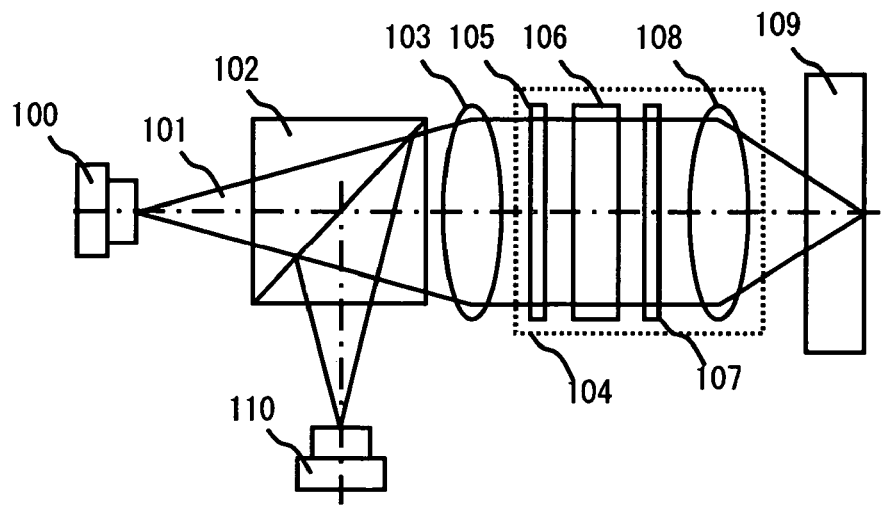
FIG. 1 is a schematic view of an optical pickup according to the present invention.

A first embodiment of the present invention is detailed hereinafter. FIG. 1 shows an example of an optical pickup according to the present invention. A three-wavelength laser 100 includes a light source for HD-DVD (wavelength λ=405 nm), a light source for DVD (wavelength λ=655 nm), and a light source for CD (wavelength λ=790 nm). The three-wavelength laser 100 outputs laser light 101 that is divergent light with a given divergent angle. The laser light 101 passes through a polarizing beam splitter 102 and enters a collimator lens 103 where it is converted to substantially parallel light. The parallel light then enters a lens module 104, which is a feature of the present invention, and focuses on an information recording surface of an optical disc 109 close to the diffraction limit. The laser beam reflected by the information recording surface of the optical disc 109 then enters the polarizing beam splitter 102 through the lens module 104. The laser beam is reflected by the polarizing beam splitter 102 and photoelectrically converted by a detector 110. Based on an electric signal obtained by the photoelectric conversion, an optical disc apparatus generates a focus servo signal, a track servo signal, a reproduction signal and so on. The thicknesses of transparent substrates of HD-DVD, DVD, and CD optical discs are 0.6 mm, 0.6 mm, and 1.2 mm, respectively.

The lens module 104 that is a feature of the present invention is detailed below. The lens module 104 of this embodiment has a limiting aperture 105, a phase compensator 106, a quarter-wavelength plate 107, and a condenser lens 108. During focus servo and tracking servo, the lens module 104 operates as a whole by an actuator, which is not shown.

The limiting aperture 105, which is a conventionally used element, determines an effective numerical aperture of the lens module 104. If the optical disc 109 is HD-DVD, the limiting aperture 105 acts so that the effective numerical aperture of the lens module 104 to approximately 0.65. If the optical disc 109 is DVD, the limiting aperture 105 acts so that the effective numerical aperture of the lens module 104 to approximately 0.60. If the optical disc 109 is CD, the limiting aperture 105 acts so that the effective numerical aperture of the lens module 104 to approximately 0.44. A wavelength selection filter that is described in Japanese Unexamined Patent Publication No. 09-54977, for example, may be used as the limiting aperture 105.

The phase compensator 106 compensates so as to reduce the wavefront aberration which the condenser lens 108 cannot reduce sufficiently. In this embodiment, the phase compensator 106 functions only when the optical disc is CD. This is detailed later.

Figure 2:
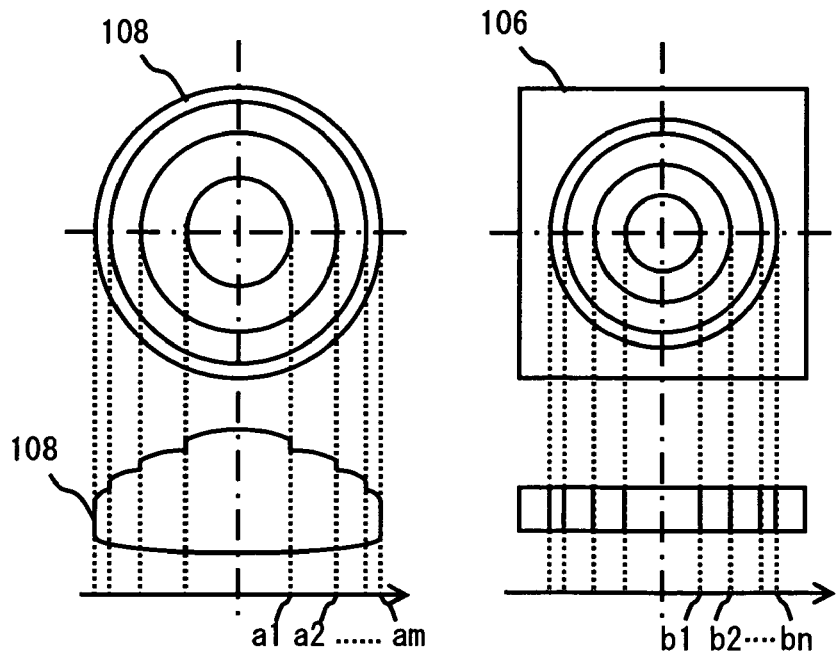
FIG. 2 is a schematic view of a condenser lens and a phase compensator according to the present invention.

The quarter-wavelength plate 107 converts linearly polarized laser light to circularly polarized light. The condenser lens 108 focuses laser beams onto the information recording surface of the optical disc 109. One side of the condenser lens 108 has a discontinuous aspherical shape as shown in FIG. 2. The discontinuous aspherical shape is determined so as to reduce wavefront aberrations when recording or reproducing HD-DVD and DVD as much as possible. A method of determining the shape is described in Japanese Unexamined Patent Publication No. 2004-127510.

FIGS. 8, 9, and 10 are lens data of the lens module 104 and the disc 109 illustrated in FIG. 1. FIG. 8 shows the data of HD-DVD, FIG. 9 shows the data of DVD, and FIG. 10 shows the data of CD. Since this embodiment uses a liquid crystal aberration correcting element as the phase compensator 106 as described later, the material of the phase compensator 106 is glass or equivalent. The material of the condenser lens 108 is plastic or equivalent, and the transparent substrate of the disc 109 is polycarbonate (PC). The refractive indexes of these materials for each wavelength are as shown in FIGS. 8, 9, and 10. "AIR" means that the space between the planes is filled with air.

Though the lens module 104 includes the quarter-wavelength plate 107 as shown in FIG. 1, FIGS. 8, 9, and 10 do not show the data about this element for simplification since the quarter-wavelength plate 107 is a plane element that merely serves to control the polarization plane of light and it does not affect the determination of the plane shape of other optical elements that constitute the lens module 104.

Figure 29:
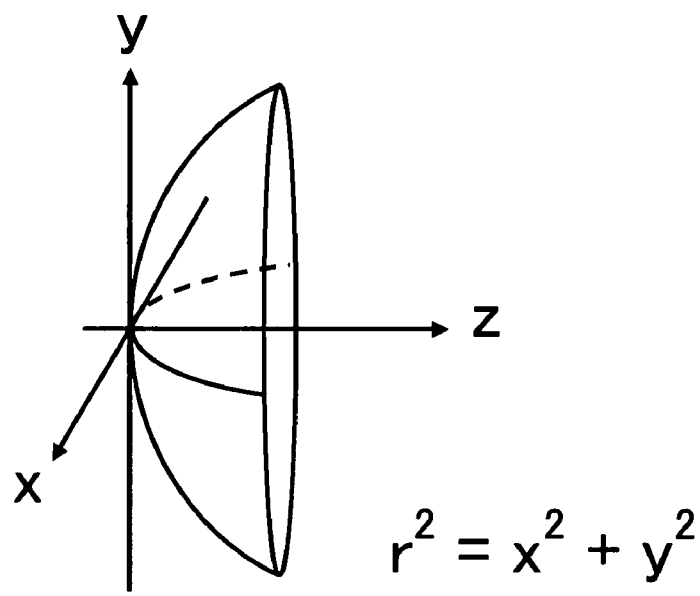
FIG. 29 is a view showing a lens coordinate axis.

FIGS. 11, 12, and 13 represent the aspherical shape of the condenser lens 108 by mathematical expression. In the coordinate system shown in FIG. 29, the shape of the aspherical lens surface is normally defined by its sag z as follows where c=1/R: Expression 1:

$$z = \frac{cr^2}{1 + \sqrt{(1 - (1+k)c^2 r^2)}} + \sum_{i=2}^{8} A_{2i} r^{2i} + B$$

FIGS. 11, 12 and 13 are data that defines the surface of the condenser lens 108 in the object side by using the parameter of the expression 1. Since the surface of the condenser lens 108 in the object side has a discontinuous aspherical shape as shown in FIG. 2, the aspherical shape is defined per each area that forms the discontinuous aspherical shape. The "area range" in FIGS. 11, 12 and 13 indicates a lens radius (mm) where the aspherical shape represented by the expression 1 is effective in each area. "B" in FIGS. 11, 12 and 13 indicates a sag amount (mm) on an optical axis. The surface in the image side having a continuous aspherical shape is shown in FIG. 13. The values of each parameter shown in FIGS. 11, 12 and 13 are determined so as to reduce wavefront aberrations in recording or reproduction of data on HD-DVD and DVD as much as possible.

As shown in FIGS. 11, 12 and 13, the surface of the condenser lens 108 in the object side is composed of ten annular zone areas. The first to seventh areas from the area including the optical axis toward the outside of the lens are commonly used for recording or reproduction of data on HD-DVD and DVD, and they are referred to as the HD-DVD/DVD common use areas. The eighth to tenth areas are used only for HD-DVD, and they are referred to as the HD-DVD exclusive use areas.

Figures 14, 15:
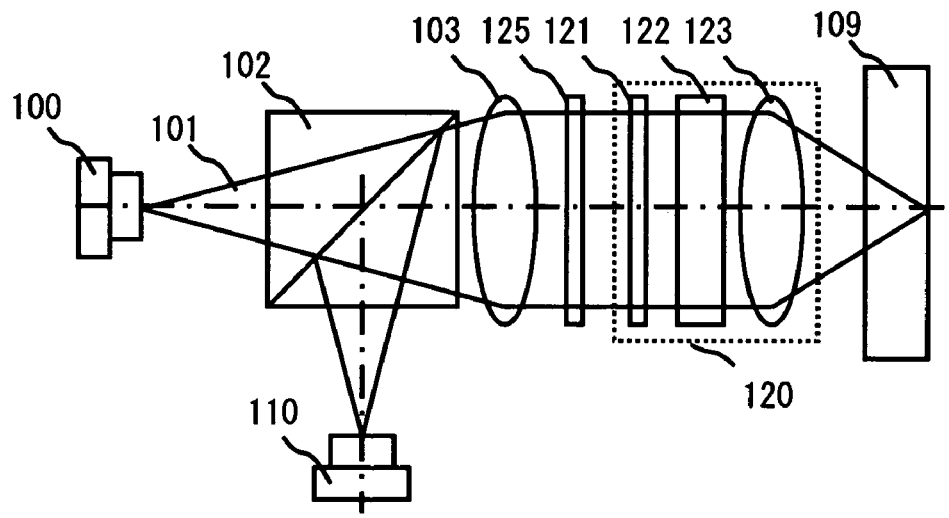
FIG. 14 is a view showing a difference in optical path length in a condenser lens according to the present invention.
FIG. 15 is a schematic view of an optical pickup according to the present invention.

FIG. 14 shows about how many times of the wavelength λ the substantial optical path length of the second to tenth zones that correspond to the HD-DVD/DVD common use area and the HD-DVD exclusive use area is deviated when a substantial optical path length of the first zone is a reference length in each aspherical area shown in FIGS. 11, 12 and 13.

As shown in FIG. 14, a difference is 2mλ (m is an integer) for HD-DVD with a 405 nm wavelength and mλ for DVD with a 655 nm wavelength and CD with a 790 nm wavelength in the second to tenth zones. This is because the relationship of substantial optical path length differences described above is easily satisfied since a shorter wavelength λ1 is 380 to 430 nm, a longer wavelength λ2 is 630 to 680 nm, and λ3 is approximately 790 nm.

Figure 3:
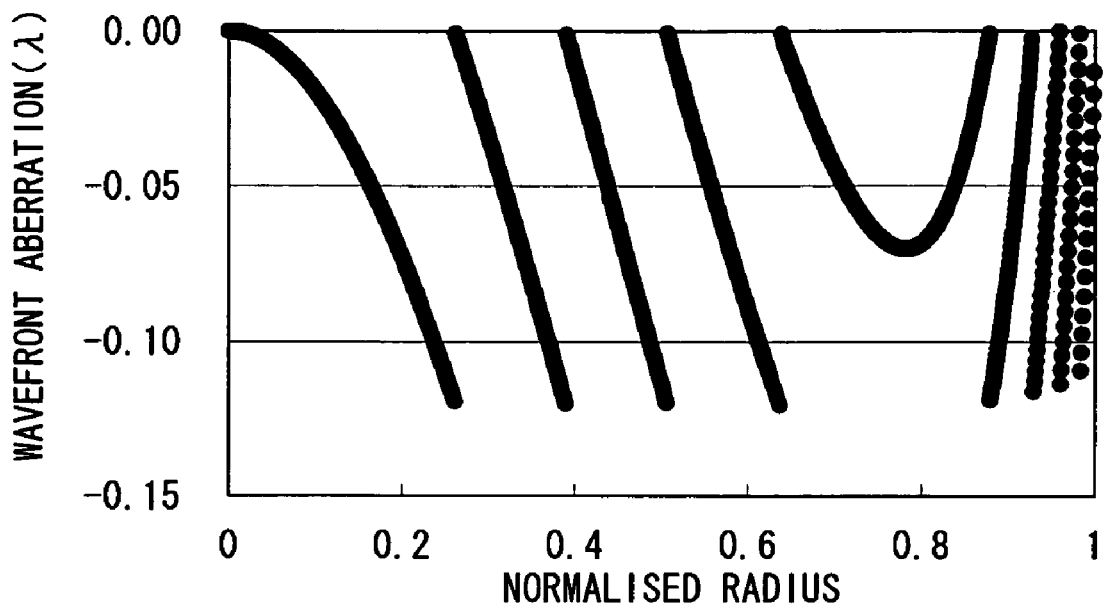
FIG. 3 is a view showing the distribution of wavefront aberration when recording or reproducing information on HD-DVD by an optical pickup according to the present invention.
Figure 4:
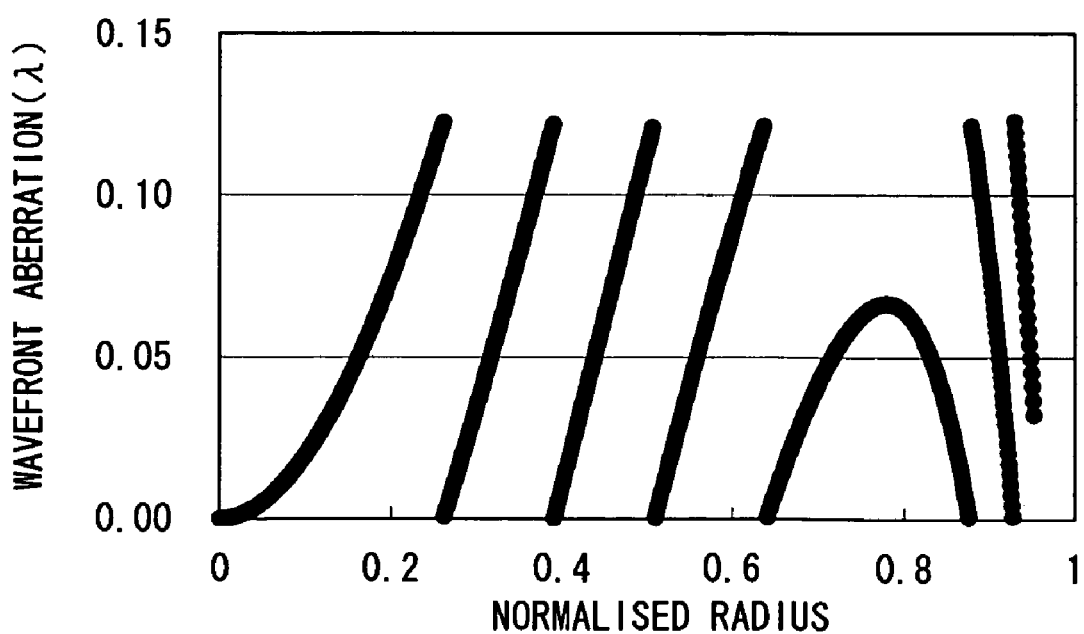
FIG. 4 is a view showing the distribution of wavefront aberration when recording or reproducing information on DVD by an optical pickup according to the present invention.

FIGS. 3 and 4 show the calculation results of the distribution of wavefront aberration for HD-DVD and DVD, respectively, after optimization of the discontinuous aspherical shape. FIGS. 3 and 4 are graphs that convert the wavefront aberrations on the information recording surface into the wavefront aberration on the entrance pupil of the condenser lens 108 by ray tracing, and their horizontal axes indicate a normalized radius of the condenser lens. An rms value of the wavefront aberration for HD-DVD is 0.034 and that for DVD is 0.035. It is thereby possible to focus laser beams on the information recording surface of the optical disc close to the diffraction limit in both cases.

Figure 5:
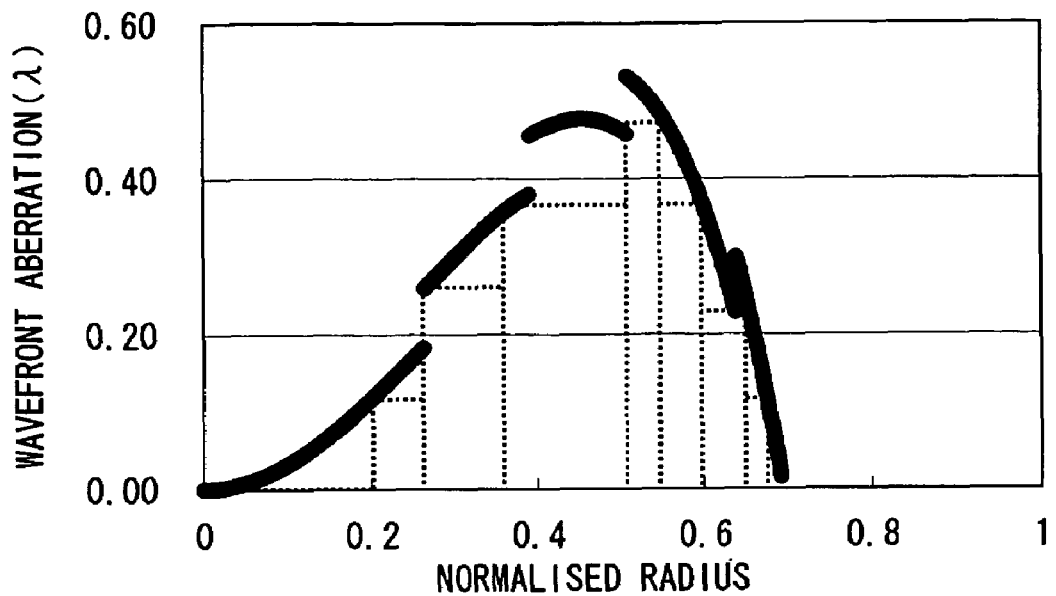
FIG. 5 is a view showing the distribution of wavefront aberration when recording or reproducing information on CD without using a phase compensator according to the present invention.

On the other hand, the calculation result of the distribution of wavefront aberration for CD is shown by the full line of FIG. 5. An rms value of the wavefront aberration for CD is 0.177, which is significantly larger than that for HD-DVD and DVD. It is thereby impossible to focus laser beams on the information recording surface of the optical disc close to the diffraction limit in the case of CD. This is because the discontinuous aspherical shape of the condenser lens 108 is determined to reduce the wavefront aberration in recording or reproduction of HD-DVD and DVD only, and the wavefront aberration for CD is not considered at all. However, the number of wavelengths that allows control of the wavefront aberration by the surface shape of the condenser lens 108 is at most two, and it is necessary to use another means to reduce the wavefront aberration for three or more different wavelengths. The distribution of wavefront aberration shown by the full line in FIG. 5 includes discontinuous points because one side surface of the condenser lens 108 has a discontinuous aspherical shape for reducing the wavefront aberration in recording or reproduction of HD-DVD and DVD as much as possible.

The phase compensator 106 reduces the wavefront aberration shown by the full line in FIG. 5 which the condenser lens 108 cannot reduce when recording or reproducing CD. The phase compensator 106 gives a phase difference of the opposite sign from the phase difference shown by the dotted line in FIG. 5 to a passing laser beam so as to produce the wavefront aberration shown in FIG. 7 as a result. The function of the phase compensator 106 is described below.

Figure 6:
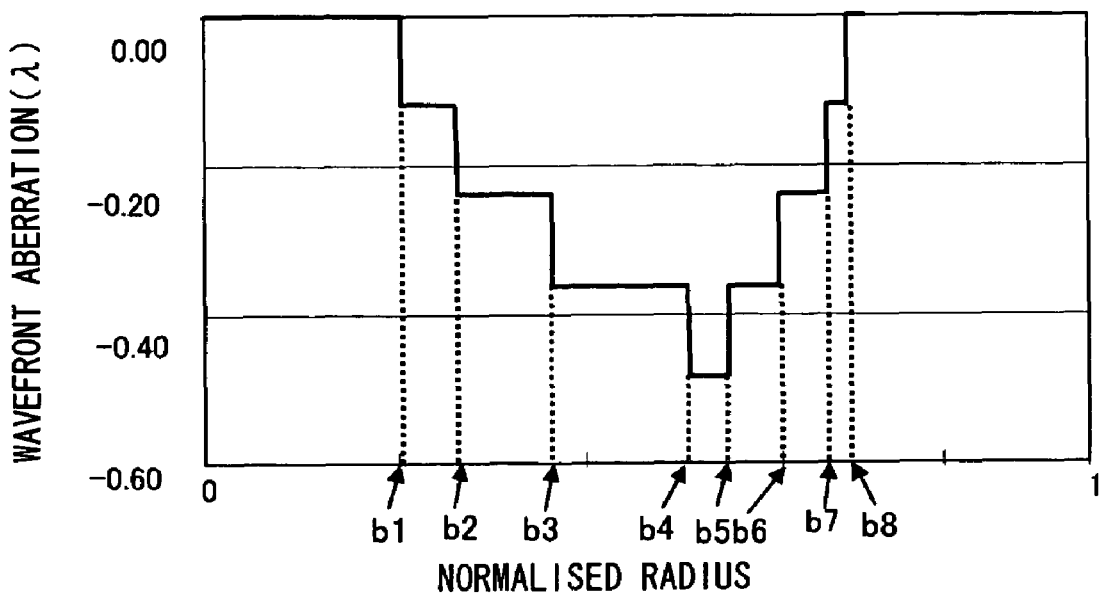
FIG. 6 is a view showing a phase difference by each phase compensating element constituting a phase compensator according to the present invention.

FIG. 2 shows an example of the phase compensator 106. The phase compensator 106 is composed of a plurality of concentric phase correcting elements, each of which has a different phase difference amount to be applied to a laser beam. As shown in FIG. 2, the concentric phase correcting elements are indicated by p1, p2 . . . . pn from the center and their extensions are indicated by b1, b2 . . . bn. In this case, if a phase difference given by each phase correcting element is p1=0λm p2=−0.12λ, p3=−0.24λ, p4=−0.36λ, p5=−0.48λ, p6=−0.36λ, p7=−0.24λ, p8=−0.12λ, p9=0λ, the extension of each phase correcting element is b1=0.204, b2=0.262, b3=0.363, b4=0.507, b5=0.549, b6=0.601, b7=0.651, b8=0.674, b9=1 in a normalized radius that is standardized by the radius of the limiting aperture 105 when recording or reproducing CD as shown in FIGS. 5 and 6.

Figure 7:
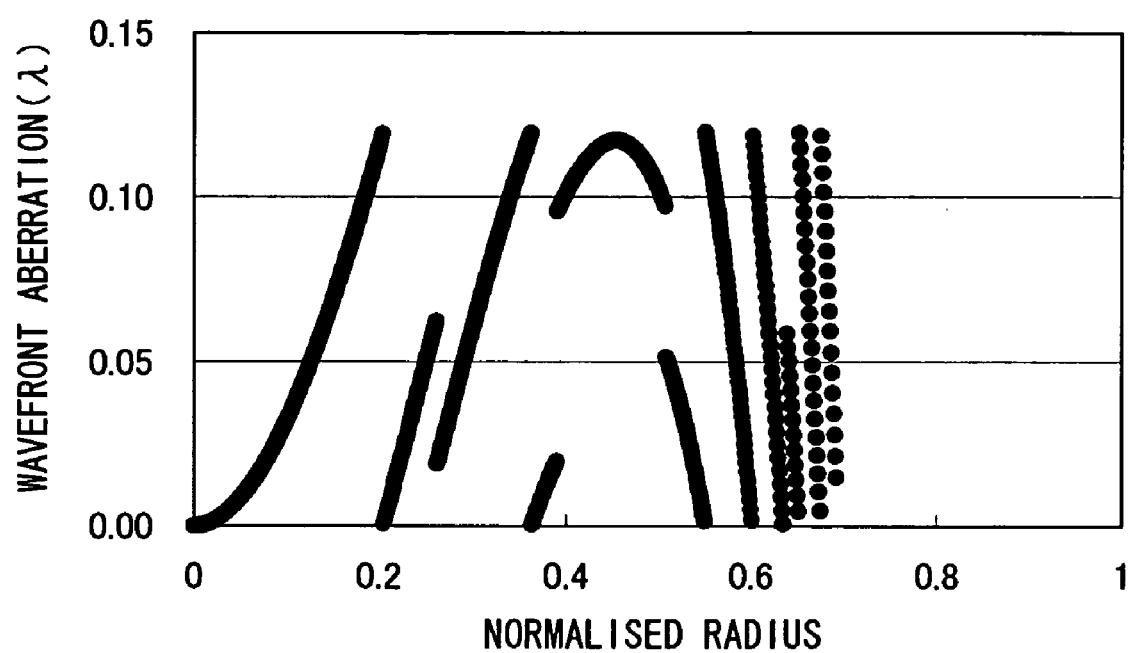
FIG. 7 is a view showing the distribution of wavefront aberration when recording or reproducing information on CD by an optical pickup according to the present invention.

FIG. 7 shows the calculation result of wavefront aberration when the wavefront aberration shown by the full line in FIG. 5 which the condenser lens 108 cannot reduce when recording or reproducing CD is reduced by using the phase compensator 106. While an rms value of wavefront aberration before compensation is 0.177, that after compensation is 0.040, which is significantly improved. Though a phase difference given by each phase correction element is a multiple of −0.12λ in this example, it is feasible to further reduce an rms value of wavefront aberration if it is a multiple of −0.10λ, for example. However, the phase compensator 106 should be composed of a larger number of phase correction elements in this case. Further, through a phase difference given by each phase correction element is a multiple of a given value in this example, the phase difference given by each phase correction element is not necessarily a multiple of a given value. For example, it is feasible to set the extensions of the phase correcting elements b1, b2 . . . so as not to correspond with discontinues points a1, a2, . . . am of the condenser lens 108 (see FIG. 2) as much as possible. This is advantageous in that tolerance increases also for misalignment between the phase compensator 106 and the condenser lens 108.

The phase compensator 106 needs to generate the above phase difference only when the optical disc is CD. Since the wavefront aberration for HD-DVD and DVD is reduced by the discontinuous aspherical shape of the condenser lens 108, the phase compensator 106 adversely increases the wavefront aberration. Therefore, it is necessary to mechanically replaceably insert the phase compensator 106 in an optical path or electrically control the operation of the phase compensator 106. The electrical control of the phase compensator 106 may be implemented by a liquid crystal aberration correction element that is described in Japanese Unexamined Patent Publication No. 10-269611.

It is also feasible to make the condenser lens 108 have a function to reduce wavefront aberration for only one wavelength and reduce the wavefront aberration for the other two wavelengths which the condenser lens 108 cannot reduce by using two phase compensators 106 that are optimized to correct wavefront aberration for each of the two wavelengths. However, since the phase compensator has finite transmittance, use of two phase compensators causes lower transmittance than use of one phase compensator.

Second Embodiment

A second embodiment of the present invention is described hereinafter in detail. The first embodiment requires an element which can be mechanically replaceably inserted in an optical path or whose operation can be electrically controlled as a phase compensator, and it uses a liquid crystal compensator as an example of such a phase compensator. The second embodiment eliminates the need for mechanically inserting or replacing a phase compensator in an optical path or electrically-controlling the operation of a phase compensator, thereby significantly simplifying the structure of the lens module of the present invention compared to the first embodiment.

FIG. 15 shows an example of an optical pickup according to the present invention. Briefly, a three-wavelength laser 100 includes a light source for HD-DVD (wavelength λ=405 nm), a light source for DVD (wavelength λ=655 nm), and a light source for CD (wavelength λ=790 nm). The three-wavelength laser 100 outputs laser light 101 that is divergent light with a given divergent angle. The laser light 101 passes through a polarizing beam splitter 102 and enters a collimator lens 103 where it is converted to substantially parallel light. The parallel light then enters a quarter-wavelength plate 125 where the linearly polarized light of the laser light 101 is converted to circularly polarized light. After that, the light enters a lens module 120, which is a feature of the present invention, and focuses on an information recording surface of an optical disc 109 close to the diffraction limit. The laser beam reflected by the information recording surface of the optical disc 109 then passes through the lens module 120 and again enters the quarter-wavelength plate 125 so that it is converted from the circularly polarized light to the linearly polarized light that is rotated by 90 degrees with respect to the polarization plane of incident light. The light then enters the polarizing beam splitter 102. The light is reflected by the polarizing beam splitter 102 and photoelectrically converted by a detector 110. Based on an electric signal obtained by the photoelectric conversion, an optical disc apparatus generates a focus servo signal, a track servo signal, a reproduction signal and so on. The thicknesses of transparent substrates of HD-DVD, DVD, and CD optical discs are 0.6 mm, 0.6 mm, and 1.2 mm, respectively.

The lens module 120 that is a feature of the present invention is detailed below. The lens module 120 of this embodiment has a limiting aperture 121, a phase compensator 122 and a condenser lens 123. During focus servo and tracking servo, the lens module 120 operates as a whole by an actuator, which is not shown.

The quarter-wavelength plate 125 is not included in the lens module 120, which is different from the first embodiment. The liquid crystal aberration correcting element that is used as the phase compensator 106 in the first embodiment has polarizing properties. The first embodiment therefore needs to place the quarter-wavelength plate 107 in the subsequent stage of the phase compensator 106. On the other hand, an element that is used as the phase compensator 122 in the second embodiment does not have polarizing properties, and the position of the quarter-wavelength plate 125 on the optical path is not restricted by the phase compensator 122. Since the lens module 120 operates as a whole by an actuator (not shown), the lens module 120 is preferably small size and light weight in order to improve the characteristic of focus servo and tracking servo. Therefore, the second embodiment places the quarter-wavelength plate 125 in the outside of the lens module 120 and in the previous stage of the lens module 120, thereby simplifying the structure of the lens module 120 compared to the first embodiment.

The limiting aperture 121 determines an effective numerical aperture NA of the lens module 120. The limiting aperture 121 has a fixed aperture, not a variable aperture, and the aperture diameter is determined so that an effective numerical aperture NA when the optical disc 109 is HD-DVD is approximately 0.65, which is different from the first embodiment. Specifically, since aperture diameter=2*NA*lens focal length, and the lens focal length=3.102 mm, the aperture diameter of the limiting aperture 121 is 4.032 mm.

On the other hand, if the optical disc 109 is DVD or CD, it is necessary to change the aperture diameter to a predetermined size as described in the first embodiment. To achieve an effective aperture control, if the optical disc 109 is DVD, the effective numerical aperture NA of the lens module 120 is designed to approximately 0.629. Then, due to the relationship with the lens focal length of 3.205 mm, it equals the aperture diameter 4.032 mm of the limiting aperture 121 that is required for HD-DVD. Therefore, it is possible to share the limiting aperture 121 with a fixed aperture where the aperture diameter=4.032 mm by both HD-DVD and DVD, there is no problem for the aperture control for DVD. On the other hand, if the optical disc 109 is CD, the phase compensator 122, which is detailed later, serves also as an aperture limiter, thereby allowing an effective aperture control. The aperture control for CD is detailed later in the description of the phase compensator 122.

The phase compensator 122 compensates to reduce the wavefront aberration for CD which the condenser lens 123 cannot reduce. Unlike the first embodiment, this embodiment does not require mechanically inserting or replacing the phase compensator 122 in an optical path or electrically controlling the operation of the phase compensator 122. This embodiment allows fixing the phase compensator 122 in the optical path when the optical disc 109 is any of HD-DVD, DVD, and CD. This is described herein only briefly and detailed later in the description of the aperture control for CD.

Figure 28:
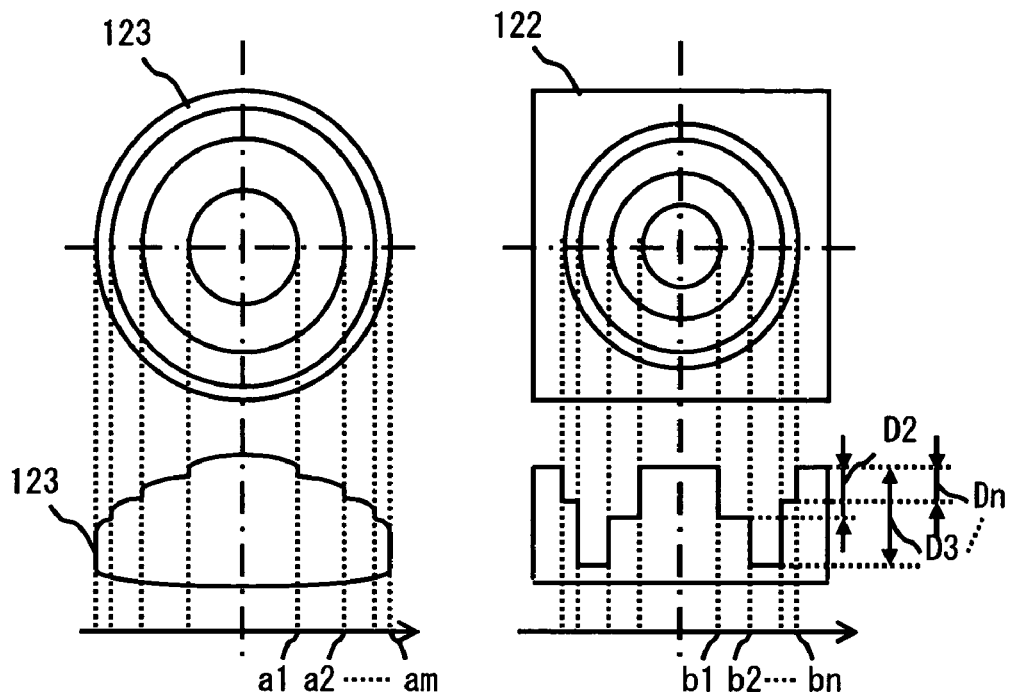
FIG. 28 is a schematic view of a condenser lens and a phase compensator according to the present invention.

The condenser lens 123 focuses laser beams onto the information recording surface of the optical disc 109. One side surface of the condenser lens 123 has a discontinuous aspherical shape as shown in FIG. 28. The discontinuous aspherical shape is determined so as to reduce wavefront aberrations in recording and reproduction of HD-DVD and DVD as much as possible.

FIGS. 20, 21 and 22 are lens data of the lens module 120 and the disc 109 illustrated in FIG. 15. FIG. 20 shows the data of HD-DVD, FIG. 21 shows the data of DVD, and FIG. 22 shows the data of CD. The material of the phase compensator 122 in this embodiment is plastic or equivalent, the material of the condenser lens 123 is also plastic or equivalent, and the transparent substrate of the disc 109 is polycarbonate (PC). The refractive indexes of these materials for each wavelength are as shown in FIGS. 20, 21 and 22. "AIR" means that the space between the planes is filled with air.

FIGS. 23, 24, and 25 represent the aspherical shape of the condenser lens 123 by mathematical expression. FIGS. 23, 24, and 25 are data that defines the surface of the condenser lens 123 in the object side by using the parameter of the expression 1. Since the surface of the condenser lens 123 in the object side has a discontinuous aspherical shape as shown in FIG. 28, the aspherical shape is defined per each area that forms the discontinuous aspherical shape. The "area range" in FIGS. 23, 24, and 25 indicates a lens radius (mm) where the aspherical shape represented by the expression 1 is effective in each area. "B" in FIGS. 23, 24, and 25 indicates a sag amount (mm) on an optical axis. The surface in the image side having a continuous aspherical shape is shown in FIG. 25. The values of each parameter shown in FIGS. 23, 24, and 25 are determined so as to reduce wavefront aberrations in recording or reproduction of data on HD-DVD and DVD as much as possible.

As shown in FIGS. 23, 24, and 25, the surface of the condenser lens 123 in the object side is composed of nine annular zone areas. All the areas are commonly used for recording or reproduction of HD-DVD and DVD in this embodiment, and thus they are referred to collectively as the HD-DVD/DVD common use areas.

FIG. 26 shows about how many times of the wavelength λ the substantial optical path length of the second to ninth zones that correspond to the HD-DVD/DVD common use areas is deviated when a substantial optical path length of the first zone is a reference length in each aspherical area shown in FIGS. 23, 24, and 25.

As shown in FIG. 26, a difference is 2mλ (m is an integer) for HD-DVD with a 405 nm wavelength and mλ for DVD with a 655 nm wavelength and CD with a 790 nm wavelength in the second to ninth zones. This is because the relationship of substantial optical path length differences described above is easily satisfied since a shorter wavelength λ1 is 380 to 430 nm, a longer wavelength λ2 is 630 to 680 nm, and λ3 is approximately 790 nm.

The phase compensator 122 has an annular zone structure centering on an optical axis as shown in FIG. 28. Each loop zone gives a different phase difference to light. To achieve this, the phase compensator 122 has a step-like annular zone structure where each loop zone has a different depth D in the optical axis direction. The depth D of each loop zone is determined based on the relationship with a refractive index n1 of the material of the phase compensator 122 corresponding to a reference light, which is light with a wavelength λ1=405 nm, so as to satisfy D=α*λ1/(n1−1) where α is an integer. The depth D of each loop zone is thereby determined so that a substantial wavefront phase does not differ depending on whether the reference light with a wavelength λ1=405 nm passes through a certain loop zone. Thus, the phase compensator 122 that is designed to satisfy the above expression does not act on the light with a wavelength for HD-DVD.

A phase difference $\Delta\phi 2$ with a DVD wavelength λ2 generated due to the depth D is represented as follows if $\phi 2 = D/\lambda 2$ and $\phi 2' = n2*D/\lambda 2$:

$$\Delta \varphi 2 = \varphi 2 - \varphi 2'$$
$$= (n2-1)D/\lambda 2$$
$$= \alpha(\lambda 1/\lambda 2) \cdot (n2-1)/(n1-1)$$

If α is determined so that the value of $\Delta\phi 2$ is close to an integer, the phase compensator 122 substantially does not act on the light with a wavelength for DVD.

A phase difference $\Delta\phi 3$ with a CD wavelength λ3 generated due to the depth D is represented as follows:

$$\Delta \varphi 3 = \varphi 3 - \varphi 3'$$
$$= (n3-1)D/\lambda 3$$
$$= \alpha(\lambda 1/\lambda 3)(n3-1)/(n1-1)$$

Since a phase difference with a CD wavelength can be compensated by the phase compensator 122, it is not necessary that $\Delta\phi 3$ is close to an integer but it is preferred that $\Delta\phi 3$ satisfies the following expression:

$$\Delta\phi 3 \leq 0.20$$

An optimum value is obtained by repeating calculation with different parameters so as to satisfy each of the above conditions. In this embodiment, the above conditions are satisfied when the integer α is a multiple of ten, which is, 10, 20, 30 and so on.

Further, the depth D is determined so that a phase of a wavefront differs as little as possible depending on whether light with a wavelength λ2=655 nm passes through a certain loop zone based on the relationship between the wavelength λ2=655 nm and a refractive index n2 of the material of the phase compensator 122 corresponding thereto.

This embodiment sets the integer α to a multiple of ten. Since the integer α is determined by the relationship of λ1, n1, λ2 and n2, its value is not limited to a multiple of ten depending on a wavelength of a light source, a material of a lens and so on. Further, the integer α may not be a multiple of ten but be a multiple of twenty, for example, in this embodiment as well. The depth D may be determined by setting the wavelength λ2=655 nm as a reference light.

Though the integer α is selected from multiples of ten in this embodiment, a specific value of the integer α for each loop zone is determined within a range that satisfies the above conditions so as to eventually reduce the wavefront aberration in recording or reproduction of CD as much as possible when applying parallel laser light with a wavelength λ3=790 nm for CD to the condenser lens 123.

Though α is an integer in the expression of D=α*λ1/(n1−1), it is not limited thereto. FIGS. 47 and 48 show the results of plotting phase lags when α is a value close to α=10, 20, respectively, where the value of α is determined to 10 and 20. As shown in FIG. 47, if a condition is that a value of phase lag (Errorλn) is less than 0.1 when α=10, this condition is satisfied when the value of α is 9.9 to 10.1. Further, as shown in FIG. 48, if a condition is that a value of phase lag (Errorλn) is less than 0.1 when α=20, this condition is satisfied when the value of α is 19.94 to 20.1. This indicates that a phase lag falls within a desired range if the value of α is about an integer ±10%.

FIG. 27 shows the structure of a phase compensator 122 that is optimized by the above technique. The number of loop zones is 18, and the depth D of each loop zone is as shown in FIG. 27. In the phase compensator 122, the surface shape and the depth D of the first loop zone including the optical axis to the seventeenth loop zone (b17=1.5162 mm) are determined so as to reduce the wavefront aberration in recording or reproduction of CD as much as possible while those of the eighteenth loop zone in the outermost part are determined so as to increase the wavefront aberration in recording or reproduction of CD. The eighteenth loop zone serves as an aperture limiter when recording or reproducing CD. In this embodiment, the depth D of the eighteenth loop zone is 0. The plane of the phase compensator 122 that forms each loop zone has a flat surface perpendicular to the optical axis.

Figure 16:
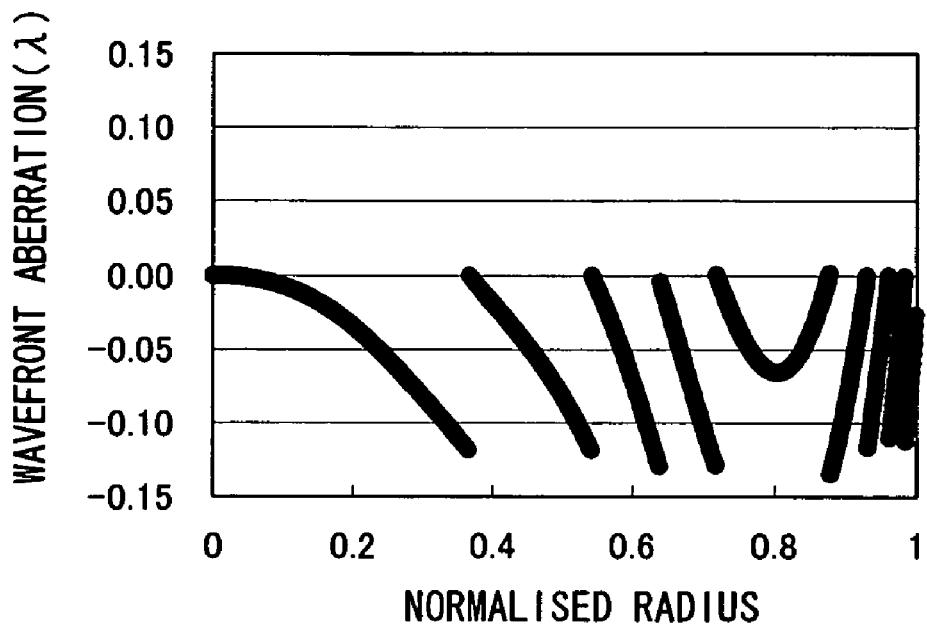
FIG. 16 is a view showing the distribution of wavefront aberration when recording or reproducing information on HD-DVD by an optical pickup according to the present invention.
Figure 17:
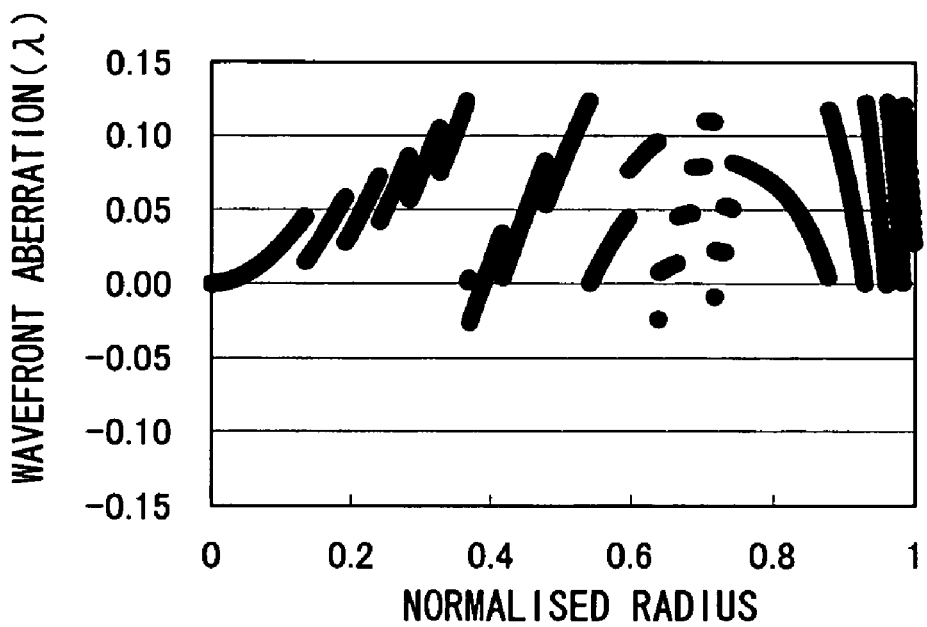
FIG. 17 is a view showing the distribution of wavefront aberration when recording or reproducing information on DVD by an optical pickup according to the present invention.

FIGS. 16 and 17 show the calculation results of the distribution of wavefront aberration for HD-DVD and DVD, respectively, in the optical system shown in FIG. 15 that is optimized as above. FIGS. 16 and 17 are graphs that convert the wavefront aberrations on the information recording surface into the wavefront aberration on the entrance pupil of the condenser lens 123 by ray tracing, and their horizontal axes indicate a normalized radius of the condenser lens. An rms value of the wavefront aberration for HD-DVD is 0.036 and that for DVD is 0.034. It is thereby possible to focus laser beams on the information recording surface of the optical disc close to the diffraction limit in both cases.

Figure 18:
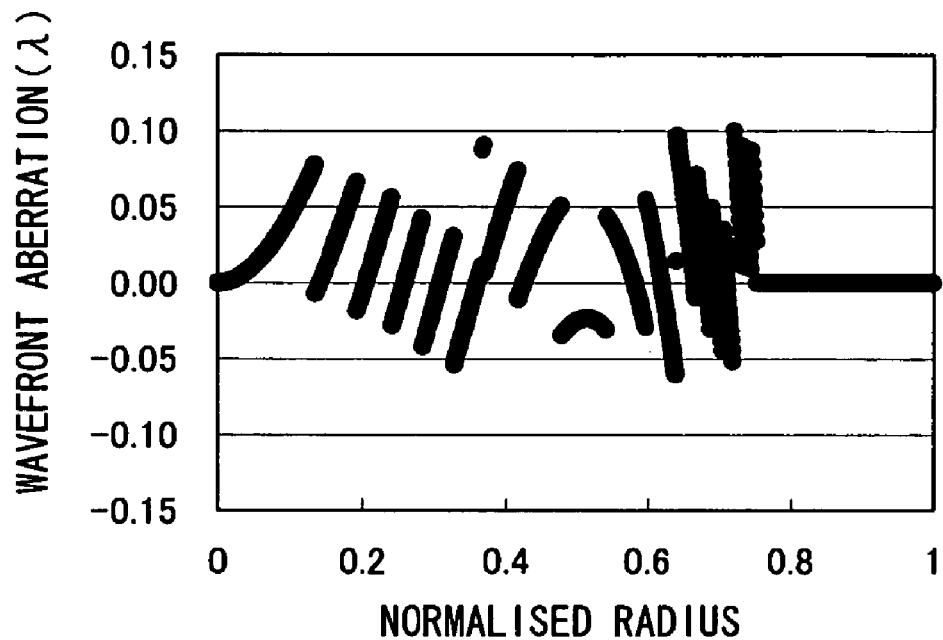
FIG. 18 is a view showing the distribution of wavefront aberration (within a limiting aperture) when recording or reproducing information on CD without using a phase compensator according to the present invention.
Figure 19:
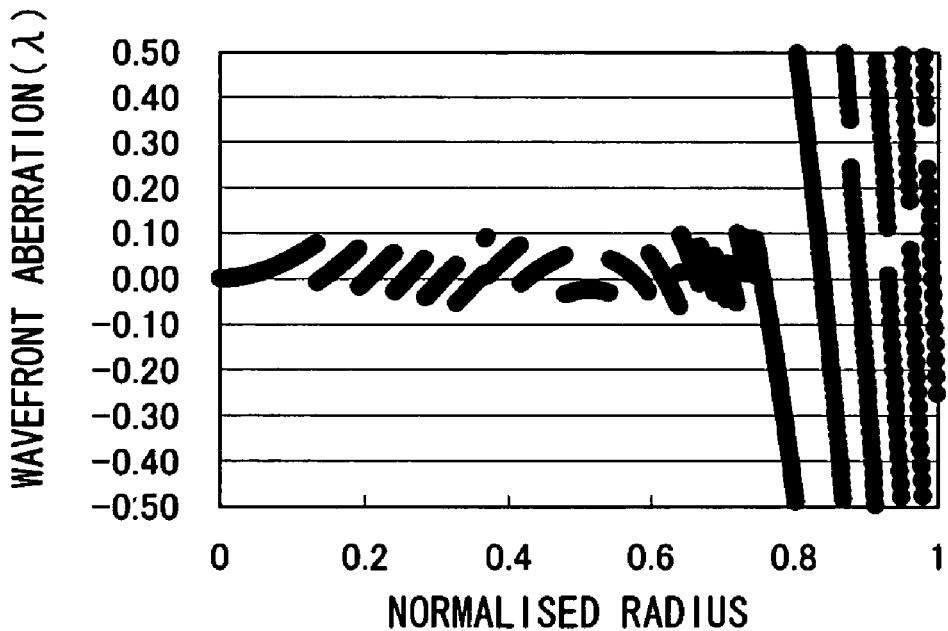
FIG. 19 is a view showing the distribution of wavefront aberration when recording or reproducing information on CD without using a phase compensator according to the present invention.

FIG. 19 shows the calculation result of the distribution of wavefront aberration on the entrance pupil for CD. FIG. 18 shows the calculation result of the distribution of wavefront aberration on the entrance pupil for CD of only the parts corresponding to the first to seventeenth loop zones. FIGS. 18 and 19 indicate that though wavefront aberration characteristics are largely suitable within the range corresponding to the first to seventeenth loop zones of the phase compensator 122, wavefront aberration is large in the range corresponding to the eighteenth loop zone in the outermost part. This is because the surface shape and the depth D of the first loop zone including the optical axis to the seventeenth loop zone are designed so as to reduce wavefront aberrations in recording or reproduction of CD as much as possible while the surface shape and the depth D of the eighteenth loop zone in the outermost part are designed so as to increase wavefront aberrations in recording or reproduction of CD. In this case, since the aberration is large for the laser light with a wavelength λ3=790 nm used for CD that has passed through the area corresponding to the eighteenth loop zone, it becomes flare light and diffused, and therefore not focused onto the information recording surface of the optical disc 109 close to the diffraction limit. On the other hand, since the aberration is small for the laser light with a wavelength λ3=790 nm used for CD that has passed through the first loop zone including the optical axis to the seventeenth loop zone, it is focused onto the information recording surface of the optical disc 109 close to the diffraction limit.

Specifically, if the wavefront aberration from the first to the seventeenth loop zone (b17=1.5162 mm, see FIG. 28) that contribute to form a spot on the disc 109 is calculated according to FIG. 18, the rms value is 0.031. Thus, for CD, the eighteenth loop zone in the outermost part of the phase compensator 122 serves as an aperture limiter to focus laser beams having passed through the first to the seventeenth loop zone onto the information recording surface of the optical disc close to the diffraction limit. In this case, NA of CD is 0.47 from the relationship of a CD effective aperture diameter=2*b17=3.032 mm and a lens focal length=3.226 mm.

In this way, the eighteenth loop zone in the outermost part of the phase compensator 122 serves as an aperture limiter when the optical disc is CD.

On the other hand, the annular zone structure, including the eighteenth loop zone, of the phase compensator 122 is optimized so as to avoid a phase difference for light with a wavelength $\lambda 1=405$ nm by the annular zone structure of the phase compensator 122 and so as to avoid a phase difference as much as possible for light with a wavelength $\lambda 2=655$ nm by the annular zone structure of the phase compensator 122 as described earlier. Therefore, use of the phase compensator 122 for the light with a wavelength $\lambda 1=405$ nm and the light with a wavelength $\lambda 2=655$ nm does not result in a significant increase in the wavefront aberration in recording or reproduction of HD-DVD and CD.

The calculation result of the distribution of wavefront aberrations for HD-DVD shown in FIG. 16 and that for DVD is shown in FIG. 17. These are the results when the phase compensator 122 is included, thus showing that sufficiently low wavefront aberrations are obtained all over the entrance pupil of the condenser lens 123.

Thus, all the loop zones of the phase compensator 122 including the eighteenth loop zone in the outermost part do not serve as an aperture limiter for the light with a wavelength $\lambda 1=405$ nm and the light with a wavelength $\lambda 2=655$ nm, and the outermost loop zone of the phase compensator 122 serves as an aperture limiter for only CD.

The outermost loop zone of the phase compensator 122 that serves as an aperture limiter for only CD may be composed of a plurality of loop zones in order to improve flare characteristics.

As described in the foregoing, the second embodiment eliminates the need for (1) using a variable aperture corresponding to each disc, (2) mechanically inserting or replacing a phase compensator on an optical path or electrically controlling the operation of a phase compensator, and (3) integrating a quarter-wavelength plate into a lens module by allowing the quarter-wavelength plate to be placed in a previous stage from a static phase plate. The second embodiment thereby significantly simplifies the structure of the lens module of the present invention compared to the first embodiment.

The first embodiment and the second embodiment takes HD-DVD as an example of an optical disc capable of ultra high density recording, the same advantages can be achieved also when it is Blu-ray. However, since a Blu-ray exclusive use area exists on a condenser lens due to a necessary effective numerical aperture in this case, it is effective to make the Blu-ray exclusive use area serve as an aperture limiter for DVD. This eliminates the need for using a variable aperture by making the phase compensator serve as an aperture limiter for CD as described in the second embodiment. The aperture limiting function for DVD may be given to the exclusive use area according to a conventional design technique such as forming a structure for diffusing only a DVD wavelength as flare light.

Third Embodiment

A third embodiment of the present invention is described hereinafter in detail. In the first and second embodiments, the surface of the condenser lens in the object side has a discontinuous aspherical shape. This shape is formed in order to reduce wavefront aberrations in recording or reproduction of HD-DVD and DVD as much as possible as described above. In the third embodiment, the surfaces of the condenser lens in the object side and the image side have a continuous aspherical shape, one side surface of the phase compensator has a discontinuous aspherical shape so as to reduce wavefront aberrations in recording or reproduction of HD-DVD and DVD as much as possible, and the other side surface of the phase compensator has an annular zone structure centering on an optical axis, each loop zone designed to give a different phase difference to light, so as to reduce wavefront aberrations in recording or reproduction of CD as much as possible.

The third embodiment is particularly effective when it is difficult to form a discontinuous aspherical shape on a condenser lens. For example, an effective numerical aperture of a lens module composed of a phase compensator and a condenser lens that is required for recording or reproduction of data on Blu-ray is approximately 0.85. In this case, it is preferred to use material having a possibly high refractive index for the condenser lens in terms of lens curvature, and glass-related material is suitable. However, though the glass-related material has a high refractive index, its melting point is generally as high as 600 degrees or more, and therefore it requires a hard die that is difficult to create a fine structure on its surface as a lens mold that is tolerable for the temperature. It is thus difficult to form a discontinuous aspherical shape on a condenser lens when using glass-related material having a high refractive index for a lens.

The third embodiment describes the case of using a glass lens where it is difficult to form a discontinuous aspherical shape in recording or reproduction of data on Blu-ray.

FIG. 15 shows an example of an optical pickup according to the present invention. Briefly, a three-wavelength laser 100 includes a light source for Blu-ray (wavelength $\lambda=405$ nm), a light source for DVD (wavelength $\lambda=655$ nm), and a light source for CD (wavelength $\lambda=790$ nm). The three-wavelength laser 100 outputs laser light 101 that is divergent light with a given divergent angle. The laser light 101 passes through a polarizing beam splitter 102 and enters a collimator lens 103 where it is converted to substantially parallel light. The parallel light then enters a quarter-wavelength plate 125 where the linearly polarized light of the laser light 101 is converted to circularly polarized light. After that, the light enters a lens module 120, which is a feature of the present invention, and focuses on an information recording surface of an optical disc 109 close to the diffraction limit. The laser beam reflected by the information recording surface of the optical disc 109 then passes through the lens module 120 and again enters the quarter-wavelength plate 125 so that it is converted from the circularly polarized light to the linearly polarized light that is rotated by 90 degrees with respect to the polarization plane of incident light. The light then enters the polarizing beam splitter 102. The light is reflected by the polarizing beam splitter 102 and photoelectrically converted by a detector 110. Based on an electric signal obtained by the photoelectric conversion, an optical disc apparatus generates a focus servo signal, a track servo signal, a reproduction signal and so on. The thicknesses of transparent substrates of Blu-ray, DVD, and CD optical discs are 0.6 mm, 0.6 mm, and 1.2 mm, respectively.

The lens module 120 that is a feature of the present invention is detailed below. The lens module 120 of this embodiment has a limiting aperture 121, a phase compensator 122 and a condenser lens 123. During focus servo and tracking servo, the lens module 120 operates as a whole by an actuator, which is not shown.

The third embodiment is different from the first embodiment and the same as the second embodiment in that the quarter-wavelength plate 125 is not included in the lens module 120. An element that is used as the phase compensator 122 in the third embodiment does not have polarizing properties as in the second embodiment, and the position of the quarter-wavelength plate 125 on the optical path is not restricted by the phase compensator 122. This embodiment thereby simplifies the structure of the lens module 120 compared to the first embodiment.

The limiting aperture 121 determines an effective numerical aperture NA of the lens module 120. The limiting aperture 121 has a fixed aperture, not a variable aperture, and the aperture diameter is determined so that an effective numerical aperture NA when the optical disc 109 is Blu-ray is approximately 0.85, which is different from the first embodiment. Specifically, since aperture diameter=2*NA*lens focal length, and the lens focal length=2.06 mm, the aperture diameter of the limiting aperture 121 is 3.5 mm.

On the other hand, if the optical disc 109 is DVD or CD, it is necessary to change the aperture diameter to a predetermined size as described in the first embodiment. To achieve an effective aperture control, the phase compensator 122 serves also as an aperture limiter for DVD and CD, thereby allowing an effective aperture control. The aperture control is detailed later in the description of the phase compensator 122.

The phase compensator 122 compensates to reduce the wavefront aberration for Blu-ray, DVD, and CD. Unlike the first embodiment, this embodiment does not require mechanically inserting or replacing the phase compensator 122 in an optical path or electrically controlling the operation of the phase compensator 122. This embodiment allows fixing the phase compensator 122 in the optical path when the optical disc 109 is any of HD-DVD, DVD, and CD. This is described herein only briefly and detailed later in the description of the aperture control for DVD and CD.

Figures 45, 46:
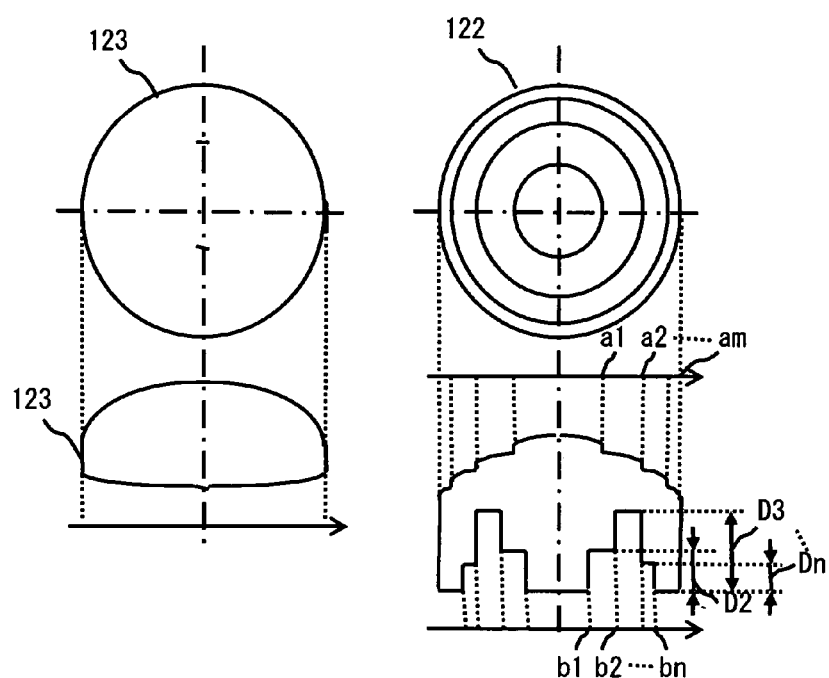
FIG. 45 is a view showing the figure of a condenser lens according to the present invention.
FIG. 46 is a schematic view of a condenser lens and a phase compensator according to the present invention.

The condenser lens 123 focuses laser beams onto the information recording surface of the optical disc 109. Both side surfaces of the condenser lens 123 have a continuous aspherical shape as shown in FIG. 46.

FIGS. 34, 35 and 36 are lens data of the lens module 120 and the disc 109 illustrated in FIG. 15. FIG. 34 shows the data of Blu-ray, FIG. 35 shows the data of DVD, and FIG. 36 shows the data of CD. The material of the phase compensator 122 in this embodiment is plastic or equivalent, the material of the condenser lens 123 is glass or equivalent, and the transparent substrate of the disc 109 is polycarbonate (PC). The refractive indexes of these materials for each wavelength are as shown in FIGS. 34, 35 and 36. "AIR" means that the space between the planes is filled with air. The thickness of a transparent substrate of a Blu-ray optical disc is 0.0875 mm in consideration of a dual-layer recording medium.

FIGS. 37, 38, 39, 40, 41 and 42 represent the aspherical shape of the phase compensator 122 by mathematical expression. FIGS. 37, 38, 39, 40, 41 and 42 are data that defines the surface of the phase compensator 122 in the object side by using the parameter of the expression 1. The surface of the phase compensator 122 in the object side is made up of 31 annular zone areas. In the third embodiment, the annular zone area in the outermost part represented by the data of FIG. 42 is a Blu-ray exclusive use area, and the inner areas represented by the data of FIGS. 37, 38, 39, 40 and 41 are Blu-ray/DVD common use areas that are used for recording and reproduction of both Blu-ray and DVD. Since the surface of the phase compensator 122 in the object side has a discontinuous aspherical shape as shown in FIG. 46, the aspherical shape is defined per each area that forms the discontinuous aspherical shape. The "area range" in FIGS. 37, 38, 39, 40, 41 and 42 indicates a lens radius (mm) where the aspherical shape represented by the expression 1 is effective in each area. "B" in FIGS. 37, 38, 39, 40, 41 and 42 indicates a sag amount (mm) on an optical axis.

The values of each parameter in the Blu-ray/DVD common use areas shown in FIGS. 37, 38, 39, 40, and 41 are determined so as to reduce wavefront aberrations in recording or reproduction of data on Blu-ray and DVD as much as possible. On the other hand, the values of each parameter in the Blu-ray exclusive use area shown in FIG. 42 are determined so as to reduce wavefront aberrations in recording or reproduction of data on Blu-ray as much as possible, and they are designed so as to increase wavefront aberrations in recording or reproduction of data on DVD and CD. The loop zone of the Blu-ray exclusive use area thereby serves as an aperture limiter when recording or reproducing data on DVD.

FIG. 43 shows about how many times of the wavelength $\lambda$ the substantial optical path length of the second to thirty-first zones that correspond to the Blu-ray/DVD common use areas and the Blu-ray exclusive use area is deviated when a substantial optical path length of the first zone is a reference length in each aspherical area shown in FIGS. 37, 38, 39, 40, 41 and 42.

As shown in FIG. 43, a difference is $2m\lambda$ (m is an integer) for Blu-ray with a 405 nm wavelength and $m\lambda$ for DVD with a 655 nm wavelength and CD with a 790 nm wavelength in the second to thirty-first zones. This is because the relationship of substantial optical path length differences described above is easily satisfied since a shorter wavelength $\lambda 1$ is 380 to 430 nm, a longer wavelength $\lambda 2$ is 630 to 680 nm, and $\lambda 3$ is approximately 790 nm.

The other surface of the phase compensator 122 has an annular zone structure centering on an optical axis as shown in FIG. 46. Each loop zone gives a different phase difference to light. To achieve this, the phase compensator 122 has a step-like annular zone structure where each loop zone has a different depth D in the optical axis direction. The depth D of each loop zone is determined based on the relationship with a refractive index n1 of the material of the phase compensator 122 corresponding to a reference light, which is light with a wavelength $\lambda 1$=405 nm, so as to satisfy $D=\alpha *\lambda 1/(n1-1)$ where $\alpha$ is an integer. The depth D of each loop zone is thereby determined so that a substantial wavefront phase does not differ depending on whether the reference light with a wavelength $\lambda 1$=405 nm passes through a certain loop zone.

Further, the depth D is determined so that a phase of a wavefront differs as little as possible depending on whether light with a wavelength $\lambda 2$=655 nm passes through a certain loop zone based on the relationship between the wavelength $\lambda 2$=655 nm and a refractive index n2 of the material of the phase compensator 122 corresponding thereto.

This embodiment sets the integer $\alpha$ to a multiple of ten. Since the integer $\alpha$ is determined by the relationship of $\lambda 1$, n1, $\lambda 2$ and n2, its value is not limited to a multiple of ten depending on a wavelength of a light source, a material of a lens and so on. Further, the integer $\alpha$ may not be a multiple of ten but be a multiple of twenty, for example, in this embodiment as well. The depth D may be determined by setting the wavelength $\lambda 2$=655 nm as a reference light.

Though the integer $\alpha$ is selected from multiples of ten in this embodiment, a specific value of the integer $\alpha$ for each loop zone is determined within a range that satisfies the above conditions so as to eventually reduce the wavefront aberration in recording or reproduction of CD as much as possible when applying parallel laser light with a wavelength $\lambda 3=790$ nm for CD to the condenser lens 123.

The integer α may be determined in the same way as described in the second embodiment, which is not described herein. Further, the value of α is not limited to an integer as described in the second embodiment.

FIG. 44 shows the structure of the phase compensator 122 that is optimized by the above technique. The number of loop zones is 24, and the depth D of each loop zone is as shown in FIG. 44. In the phase compensator 122, the surface shape and the depth D of the first loop zone including the optical axis to the twenty-third loop zone (b23=1.118119 mm) are determined so as to reduce the wavefront aberration in recording or reproduction of CD as much as possible while those of the twenty-fourth loop zone in the outermost part are determined so as to increase the wavefront aberration in recording or reproduction of CD. The twenty-fourth loop zone serves as an aperture limiter when recording or reproducing data on CD. In this embodiment, the depth D of the twenty-fourth loop zone is 0. The plane of the phase compensator 122 that forms each loop zone has a flat surface perpendicular to the optical axis.

FIG. 45 represents the aspherical shape of the condenser lens 123 by mathematical expression. As described earlier, the plane that forms the condenser lens 123 has a continuous aspherical shape.

Figure 30:
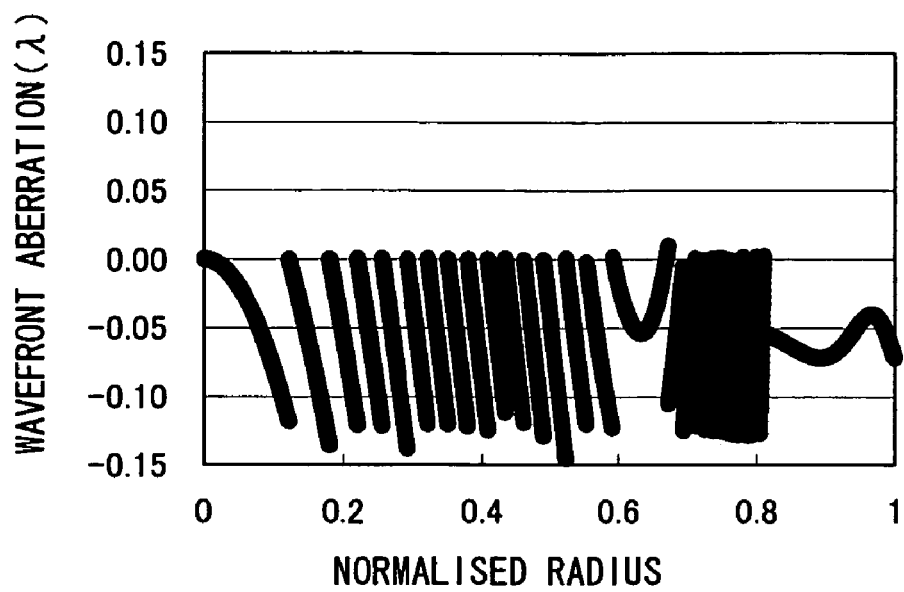
FIG. 30 is a view showing a calculation result of the distribution of wavefront aberration in Blu-ray according to the present invention.
Figure 31:
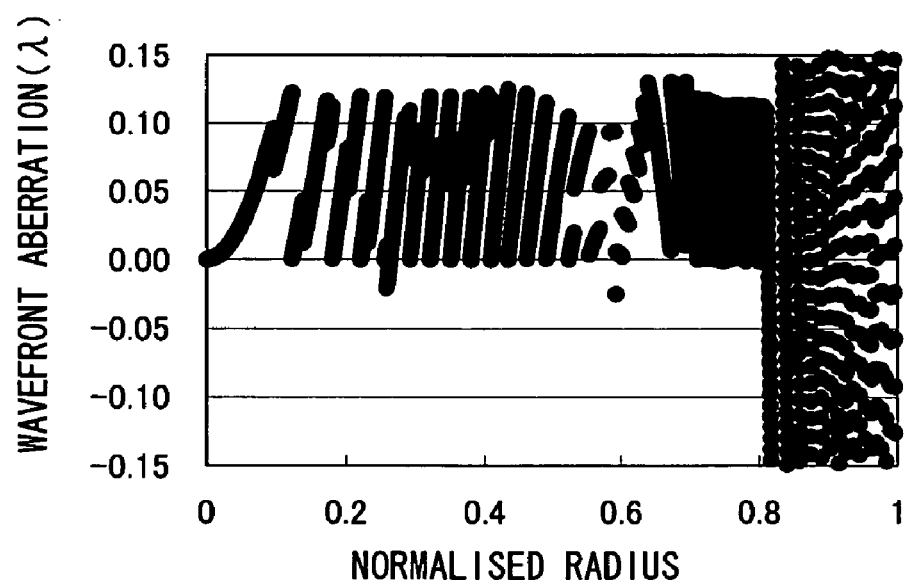
FIG. 31 is a view showing a calculation result of the distribution of wavefront aberration in DVD according to the present invention.

FIGS. 30 and 31 show the calculation results of the distribution of wavefront aberration for Blu-ray and DVD, respectively, in the optical system shown in FIG. 15 that is optimized as above. FIGS. 30 and 31 are graphs that convert the wavefront aberrations on the information recording surface into the wavefront aberration on the entrance pupil of the condenser lens 123 by ray tracing, and their horizontal axes indicate a normalized radius of the condenser lens. An rms value of the wavefront aberration for Blu-ray is 0.034 and that for DVD is 0.036. It is thereby possible to focus laser beams on the information recording surface of the optical disc close to the diffraction limit in both cases. In the case of DVD, wavefront aberration is large in the range corresponding to the Blu-ray exclusive use area in the outermost part. This is because while it is designed so as to reduce the wavefront aberration in recording or reproduction of data on Blu-ray and DVD as much as possible in the Blu-ray/DVD common use areas, the value of each parameter in the Blu-ray exclusive use area is designed so as to reduce the wavefront aberration in recording or reproduction of data on Blu-ray as much as possible while increasing the wavefront aberration in recording or reproduction of data on DVD and CD. The loop zone of the Blu-ray exclusive use area serves as an aperture limiter when recording or reproducing data on DVD.

Figure 32:
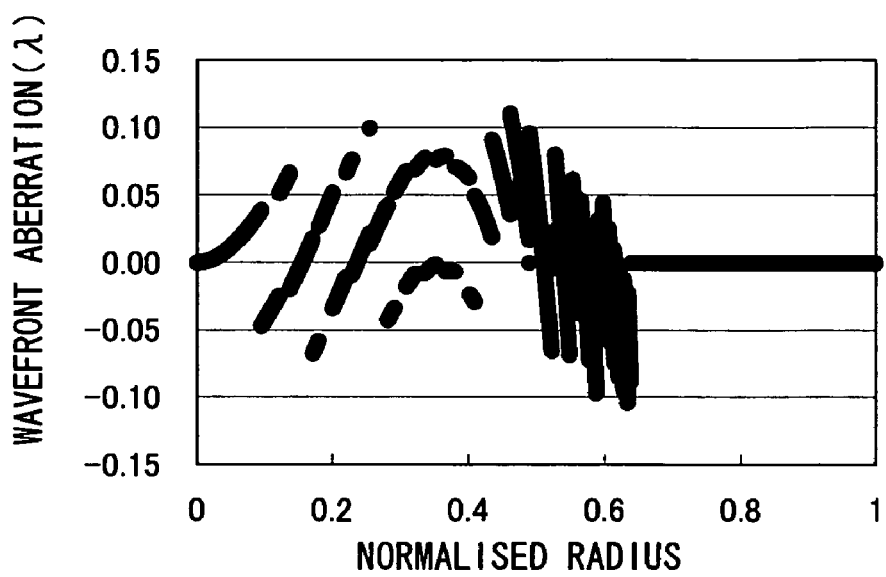
FIG. 32 is a view showing a calculation result of the distribution of wavefront aberration of the entrance pupil in CD according to the present invention.
Figure 33:
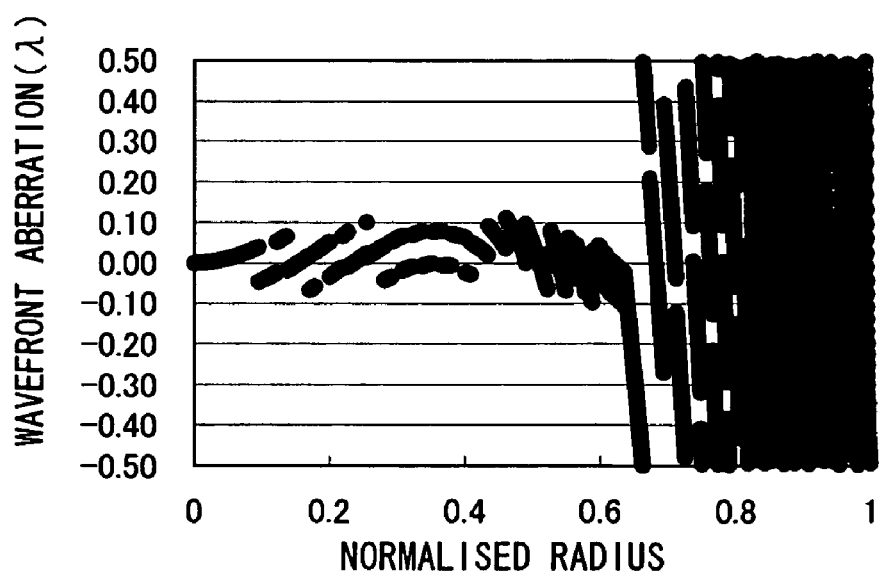
FIG. 33 is a view showing a calculation result of the distribution of wavefront aberration of the entrance pupil in CD according to the present invention.

FIG. 33 shows the calculation result of the distribution of wavefront aberration on the entrance pupil for CD. FIG. 32 shows the calculation result of the distribution of wavefront aberration on the entrance pupil for CD of only the parts corresponding to the first to twenty-third loop zones. FIGS. 32 and 33 indicate that though wavefront aberration characteristics are largely suitable within the range corresponding to the first to twenty-third loop zones of the phase compensator 122, wavefront aberration is large in the range corresponding to the twenty-fourth loop zone in the outermost part. This is because the surface shape and the depth D of the first loop zone including the optical axis to the twenty-third loop zone are designed so as to reduce wavefront aberrations in recording or reproduction of CD as much as possible while the surface shape and the depth D of the twenty-fourth loop zone in the outermost part are designed so as to increase wavefront aberrations in recording or reproduction of CD. In this case, since the aberration is large for the laser light with a wavelength $\lambda 3=790$ nm used for CD that has passed through the area corresponding to the twenty-fourth loop zone, it becomes flare light and diffused, and therefore not focused onto the information recording surface of the optical disc 109 close to the diffraction limit. On the other hand, since the aberration is small for the laser light with a wavelength $\lambda 3=790$ nm used for CD that has passed through the first loop zone including the optical axis to the twenty-third loop zone, it is focused onto the information recording surface of the optical disc 109 close to the diffraction limit.

Specifically, if the wavefront aberration from the first to the twenty-third loop zone (b23=1.118119 mm, see FIG. 44) that contribute to form a spot on the disc 109 is calculated according to FIG. 32, the rms value is 0.041. Thus, for CD, the twenty-fourth loop zone in the outermost part of the phase compensator 122 serves as an aperture limiter to focus laser beams having passed through the first to the twenty-third loop zone onto the information recording surface of the optical disc close to the diffraction limit. In this case, NA of CD is 0.51 from the relationship of a CD effective aperture diameter=2*b23=2.236 mm and a lens focal length=2.29283 mm.

In this way, the twenty-fourth loop zone in the outermost part of the phase compensator 122 serves as an aperture limiter when the optical disc is CD.

On the other hand, the annular zone structure, including the twenty-fourth loop zone, of the phase compensator 122 is optimized so as to avoid a phase difference for light with a wavelength $\lambda 1=405$ nm by the annular zone structure of the phase compensator 122 and so as to avoid a phase difference as much as possible for light with a wavelength $\lambda 2=655$ nm by the annular zone structure of the phase compensator 122 as described earlier. Therefore, use of the phase compensator 122 for the light with a wavelength $\lambda 1=405$ nm and the light with a wavelength $\lambda 2=655$ nm does not result in a significant increase in the wavefront aberration in recording or reproduction of Blu-ray and CD.

The calculation result of the distribution of wavefront aberrations for Blu-ray shown in FIG. 30 and that for DVD is shown in FIG. 31. These are the results when the phase compensator 122 is included, thus showing that sufficiently low wavefront aberrations are obtained all over the entrance pupil of the condenser lens 123.

Thus, all the loop zones of the phase compensator 122 including the twenty-fourth loop zone in the outermost part do not serve as an aperture limiter for the light with a wavelength $\lambda 1=405$ nm and the light with a wavelength $\lambda 2=655$ nm, and the outermost loop zone of the phase compensator 122 serves as an aperture limiter for only CD.

The outermost loop zone of the phase compensator 122 that serves as an aperture limiter for only CD may be composed of a plurality of loop zones in order to improve flare characteristics.

As described in the foregoing, the third embodiment eliminates the need for (1) using a variable aperture corresponding to each disc, (2) mechanically inserting or replacing a phase compensator on an optical path or electrically controlling the operation of a phase compensator, and (3) integrating a quarter-wavelength plate into a lens module by allowing the quarter-wavelength plate to be placed in a previous stage from a static phase plate, thereby significantly simplifying the structure of the lens module of the present invention compared to the first embodiment. The third embodiment further eliminates the need for forming a discontinuous shape on the condenser lens, thereby allowing use of glass-related material having a high refractive index for a condenser lens.

Though a discontinuous aspherical shape and an annular zone structure are formed on each of both sides of one phase compensator in the phase compensator 122 shown in FIG. 46, it is feasible to form a discontinuous aspherical shape on one of two phase compensators and form an annular zone structure on the other phase compensator.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A pickup lens with a phase compensator comprising:
   a condenser lens having a continuous aspherical shape on both surfaces; and
   a phase compensator including a first surface having a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$, and a second surface having a step-like annular zone structure to compensate wavefront aberration generated when recording and reproducing data on an information recording medium having a substrate thickness of t3 with a laser beam having a wavelength $\lambda 3$.

2. The pickup lens with a phase compensator according to claim 1, wherein the wavelength $\lambda 1$ is substantially 405 nm, the wavelength $\lambda 2$ is substantially 655 nm, the wavelength $\lambda 3$ is substantially 790 nm, the substrate thickness t1 is substantially 0.1 mm, the substrate thickness t2 is substantially 0.6 mm, and the substrate thickness t3 is substantially 1.2 mm.

3. The pickup lens with a phase compensator according to claim 1, wherein the wavelength $\lambda 1$ is substantially 405 nm, the wavelength $\lambda 2$ is substantially 655 nm, the wavelength $\lambda 3$ is substantially 790 nm, the substrate thickness t1 is substantially 0.6 mm, the substrate thickness t2 is substantially 0.6 mm, and the substrate thickness t3 is substantially 1.2 mm.

4. The pickup lens with a phase compensator according to claim 1, wherein if a refractive index of a phase compensator for a laser beam of a wavelength $\lambda 1$ is n1, a step D in the annular zone structure on the first surface of the phase compensator is represented by $D=\alpha*\lambda 1/(n1-1)$ where $\alpha$ is an integer or a value within an integer $\pm 10\%$.

5. An optical pickup apparatus for recording and reproducing data on information recording media having a substrate thickness of t1, t2 and t3 with a wavelength of $\lambda 1$, $\lambda 2$ and $\lambda 3$, wherein
   the optical pickup apparatus records and reproduces data on information recording media by using a pickup lens with a phase compensator, the pickup lens with a phase compensator comprising:
   a condenser lens having a continuous aspherical shape on both surfaces; and
   a phase compensator including a first surface having a step-like annular zone structure to compensate wavefront aberration generated when recording and reproducing data on an information recording medium having a substrate thickness of t1 with a laser beam having a wavelength $\lambda 1$ and wavefront aberration generated when recording and reproducing data on an information recording medium having a substrate thickness of t2 with a laser beam having a wavelength $\lambda 2$, and a second surface having a step-like annular zone structure to compensate wavefront aberration generated when recording and reproducing data on an information recording medium having a substrate thickness of t3 with a laser beam having a wavelength $\lambda 3$.

6. The optical pickup apparatus according to claim 5, wherein the wavelength $\lambda 1$ is substantially 405 nm, the wavelength $\lambda 2$ is substantially 655 nm, the wavelength $\lambda 3$ is substantially 790 nm, the substrate thickness t1 is substantially 0.1 mm, the substrate thickness t2 is substantially 0.6 mm, and the substrate thickness t3 is substantially 1.2 mm.

7. The optical pickup apparatus according to claim 5, wherein the wavelength $\lambda 1$ is substantially 405 nm, the wavelength $\lambda 2$ is substantially 655 nm, the wavelength $\lambda 3$ is substantially 790 nm, the substrate thickness t1 is substantially 0.6 mm, the substrate thickness t2 is substantially 0.6 mm, and the substrate thickness t3 is substantially 1.2 mm.

8. The optical pickup apparatus according to claim 5, wherein if a refractive index of a phase compensator for a laser beam of a wavelength $\lambda 1$ is n1, a step D in the annular zone structure on the first surface of the phase compensator is represented by $D=\alpha*\lambda 1/(n1-1)$ where $\alpha$ is an integer or a value within an integer $\pm 10\%$.

* * * * *